United States Patent
Kunugi et al.

(10) Patent No.: US 7,573,991 B2
(45) Date of Patent: *Aug. 11, 2009

(54) COMMUNICATION CONTROL SYSTEM AND COMMUNICATION CONTROL METHOD

(75) Inventors: Takanobu Kunugi, Tokorozawa (JP); Yurako Kunugi, Tokorozawa (JP)

(73) Assignee: International Communication Sales Co., Ltd., Tokyo (JP)

( * ) Notice: Subject to any disclaimer, the term of this patent is extended or adjusted under 35 U.S.C. 154(b) by 414 days.

This patent is subject to a terminal disclaimer.

(21) Appl. No.: 10/923,953

(22) Filed: Aug. 23, 2004

(65) Prior Publication Data

US 2005/0060262 A1  Mar. 17, 2005

(51) Int. Cl.
*H04M 1/00* (2006.01)
(52) U.S. Cl. ............... 379/114.17; 379/114.02; 379/115.01; 455/405; 705/35
(58) Field of Classification Search .......... 705/34, 705/35; 379/114.17, 115.01, 114.02; 455/405
See application file for complete search history.

(56) References Cited

U.S. PATENT DOCUMENTS

| | | | | |
|---|---|---|---|---|
| 4,706,275 | A * | 11/1987 | Kamil | 379/114.2 |
| 5,148,474 | A * | 9/1992 | Haralambopoulos et al. | 379/114.25 |
| 5,577,100 | A * | 11/1996 | McGregor et al. | 455/406 |
| 5,802,502 | A * | 9/1998 | Gell et al. | 705/37 |
| 5,960,416 | A * | 9/1999 | Block | 705/34 |
| 6,829,339 | B1 * | 12/2004 | Kunugi et al. | 379/114.17 |

FOREIGN PATENT DOCUMENTS

| | | |
|---|---|---|
| JP | 6205138 | 12/1990 |
| JP | 03-010457 | 1/1991 |

(Continued)

OTHER PUBLICATIONS

The Glossary Exchange, pp. 1 (line 18-27) and p. 2 (entire page) from the original PCT filing, entitled Electronic Telecommunications Glossary No. 15 from the Electronic Telecommunication Society, Mar. 31, 1983 (with translation and certtificate of translation).

(Continued)

*Primary Examiner*—Kambiz Abdi
*Assistant Examiner*—Jennifer Liversedge
(74) *Attorney, Agent, or Firm*—Lackenbach Siegel, LLP; Andrew F. Young

(57) ABSTRACT

A first communication control system comprising a balance database for storing the prepaid money of each per caller number, a charge database for storing the charge system of each communication company, a balance checking part for checking the balance by searching the balance database with the caller number, a call permission determining part for determining the permission of a call of the caller based on the balance, a communication company specifying part for specifying one communication company based on the input number from a caller terminal, a line switch and a line control part for connecting the caller terminal with a called terminal through an exchange of the specified communication company, a speech time measuring part for measuring the speech time, a telephone charge calculating part for calculating the speech time and the telephone charge according to the charge system of the communication company, and a balance updating part for subtracting the telephone charge from the balance of the caller.

4 Claims, 16 Drawing Sheets

FOREIGN PATENT DOCUMENTS

| | | |
|---|---|---|
| JP | 03-237856 | 10/1991 |
| JP | 5101257 | 10/1991 |
| JP | 04-335741 | 11/1992 |
| JP | 04-367147 | 12/1992 |
| JP | 05-083391 | 4/1993 |
| JP | 05-260220 | 10/1993 |
| JP | 06-205138 | 7/1994 |
| JP | 06-217040 | 8/1994 |
| JP | 06-243150 | 9/1994 |
| JP | 06-253022 | 9/1994 |
| JP | 06-334751 | 12/1994 |
| JP | 07-058842 | 3/1995 |
| JP | 07-177230 | 7/1995 |
| JP | 07-231367 | 8/1995 |
| JP | 07-250165 | 9/1995 |
| JP | 07-283890 | 10/1995 |
| JP | 07-327094 | 12/1995 |
| JP | 08-163278 | 6/1996 |
| JP | 09-018609 | 1/1997 |
| JP | 09-153937 | 6/1997 |
| JP | 09-172656 | 6/1997 |
| JP | 09-312708 | 12/1997 |
| JP | 11-098136 | 4/1999 |

OTHER PUBLICATIONS

JP 11-219594, office action in Japanese (3 pages), translation in English (6 pages) English response (2 pages), resulted in allowance JP 3345377 (11 pages).

* cited by examiner

FIG. 2

| CALLER NUMBER | CURRENT BALANCE | UPDATE DATE | SUBSCRIBER NAME |
|---|---|---|---|
| 030-405-6010 | 10,254 | 1998/7/12 | サイトウ トオル |
| 020-643-3150 | 158,453 | 1998/6/29 | コマタ アキラ |
| 010-030-1825 | 356,789 | 1998/7/10 | ニシザキ マコト |
| 030-205-7681 | 145,865 | 1998/7/15 | ササジマ ミキ |
| 080-395-7981 | 2,456 | 1998/6/25 | キヌタ タダシ |
| . | . | . | . |
| . | . | . | . |
| . | . | . | . |
| . | . | . | . |
| . | . | . | . |

FIG. 4

| COUNTRY NUMBER | AREA CODE | DAYTIME | | NIGHT TIME AND HOLIDAY | | MIDNIGHT | |
|---|---|---|---|---|---|---|---|
| | | FIRST ONE MINUTE | AFTER ELAPSE OF ONE MINUTE | FIRST ONE MINUTE | AFTER ELAPSE OF ONE MINUTE | FIRST ONE MINUTE | AFTER ELAPSE OF ONE MINUTE |
| ⋮ | ⋮ | ⋮ | ⋮ | ⋮ | ⋮ | ⋮ | ⋮ |
| 54 | — | 39 | 30 | 31 | 24 | 27 | 21 |
| ⋮ | ⋮ | ⋮ | ⋮ | ⋮ | ⋮ | ⋮ | ⋮ |
| 82 | — | 28 | 14 | 22 | 11 | 20 | 10 |
| ⋮ | ⋮ | ⋮ | ⋮ | ⋮ | ⋮ | ⋮ | ⋮ |

COMMUNICATION CONTROL SYSTEM AND COMMUNICATION CONTROL METHOD

Priority claim

This application claims priority from JP 10-233516, filed Aug. 5, 1998; JP 10-286098, filed Sep. 22, 1998; and JP 11-66305filed Mar. 12, 1999; all filed as PCT/JP99/04203 filed Aug. 4, 1999 which entered the US National Phase as U.S. Ser. No. 09/762,024 filed Feb. 1, 2001, now issued as U.S. Pat. No. 6,829,339 on Dec. 7, 2004.

TECHNICAL FIELD

The present invention relates to a communication control system and a communication control method and more specifically to a communication control system and a communication control method having various charge payment functions accompanying to communication made through telephone lines.

BACKGROUND OF THE INVENTION

Presently, it is required to make a user contract with an international communication company in advance in order to make overseas telephone calls from a mobile communication terminal such as a portable telephone and PHS. That is, the user is required to submit a predetermined application sheet to the international communication company by writing own name, address, where to make contact, a payment method and others.

At this time, while persons having credit cards can select "Pay by Credit" as the payment method, persons who do not have such cards cannot but select "Pay by Bill" which requires a deposit after being examined by visiting the international communication company or by a letter, thus taking time until obtaining an approval.

There is also a method of utilizing a prepaid card for international calls. It enables the user to make an overseas call within the count of the card by inputting a card number recorded in the prepaid card from the portable telephone before dialing a called telephone number.

By the way, a plurality of international communication companies are now widely competing each other by arming with uniqueness of contents of services and their telephone charges are not uniform, thus causing large differences in the charges depending on time zones and countries (regions) to which calls are made. Therefore, persons who frequently make overseas calls naturally want to properly use the communication company whose telephone charge is the lowest depending on the time zone and the countries (regions) to which the call is made.

However, it requires the user to make user contracts with the plurality of communication companies in advance, taking much time. It is especially trouble some to pay a deposit to each communication company for persons who cannot have credit cards.

Although the use of the prepaid card allows the user to be released from the complicatedness of making the contract or paying the deposit in advance, there remains a problem that the user must buy a plurality of kinds of prepaid cards in advance to use the communication companies properly.

Further, while the user is required to input the number of own card recorded therein as described above in case of the prepaid card before inputting a country number, an area code number, a local office number and a subscriber's number of the called side terminal, it has been inconvenient because a number of digits of the card number is relatively large (e.g., "31-723-7381-5419-#") and the input has to be made from the beginning when an erroneous input is made even at one number on the way of the input. In particular, when the user uses many prepaid cards in succession in order to make a relatively long speech, the user is obliged to conduct cumbersome works of inputting the number of each prepaid card continuously.

While those described above are the points inconvenient for the users of international calls, there have been also inconvenient points for the company issuing the prepaid cards that it naturally costs to create the cards and to transport and to stock such cards having a value as a note.

While those described above are the cases when persons having been already using the mobile communication terminals make an international call from their own mobile communication terminal, they had to select one company from a plurality of mobile communication companies and to make a subscriber's contract with a mobile communication company in order to start to use the mobile communication terminal.

They had to write own name, address, a method of payment and others to a predetermined subscriber application sheet and to stamp thereon in making such contract. At this time, the user is obliged to show an identification such as a driver license and a health insurance card. The user also had to wait for several hours until the result of examination whether or not the subscription is permitted is issued.

Therefore, there has been a request centering on the age of young people that they want to use the mobile communication terminals more simply.

Still more, it has been inconvenient for foreigners who temporarily stay in Japan for the purpose of business and sight-seeing for example that they cannot use the mobile communication terminals because they don't have an address in Japan.

In order to deal with such a problem, there has been a method of renting the mobile communication terminals to persons who want to use them temporarily. That is, a rental company who have bought a plurality of mobile communication terminals from the mobile communication company and made the subscriber's contracts rents the mobile communication terminals to the foreigners and others who want to use them temporarily.

Because the direct subscriber is the rental company in this case, the persons who do not have an address in Japan can use the mobile communication terminal.

Further, because the rental company takes the responsibility of the direct payment of the basic fee and rental fee, there is no demerit for the mobile communication company even if the actual user is a person who has no credit in Japan.

However, there is always a risk for the rental company that the user runs away with the mobile communication terminal without paying the high rental fee. It has been then necessary to ask to submit a large amount of deposit in advance in order to reduce this risk while hampering the convenience of good users.

Further, even if a certain amount of deposit has been assured, it is unable to eliminate the risk of causing a bad debt completely because there is no means for suppressing the rental fee exceeding that amount.

Still more, while mail-orders utilizing telephones and personal computer communications (including Internet communications) are now being actively conducted, no safe charge payment method has been established yet. Normally, the charge is paid by transferring to the bank account of the mail-order company after the arrival of merchandise or by paying to the delivery company in exchange of the merchandise when it is delivered (so called 'substitutional payment').

However, in case of the transfer method, the mail-order company always has a risk of bad debt. The person who bought the merchandise is also required to transfer the charge by visiting a banking organ and has to bear the transfer fee.

Although no bad debt occurs for the mail-order company in case of the substitutional payment, there is a problem that the person who bought the merchandise has to bear the relatively expensive substitutional payment fee.

The present invention has been devised in order to solve the above-mentioned problems and its first object is to establish a telephone charge payment method which causes no risk of causing a bad debt of telephone charge. If the bad debt can be totally eliminated as described above, it becomes possible to make an international call from the mobile communication terminal immediately with a simple procedure without making a utility contract which requires the preliminary examination and the deposit with the international communication company in advance or without buying a prepaid card. It is also possible to properly use a plurality of international communication companies.

A second object of the invention is to establish a technology which enables any one to use mobile communication terminals with a simple procedure.

A third object of the invention is to establish a safe and simple charge payment method in the mail-order via telephone lines.

DISCLOSURE OF THE INVENTION

In order to achieve the above-mentioned objects, an inventive communication control system comprises balance storage means for storing an amount of prepaid money of each caller who is the user of this system together with the caller number which is the number of a communication terminal used by the caller, charge storage means for storing the charge system per called location of at least one communication company, balance checking means for checking the balance of the prepaid money of the caller by searching the balance storage means with the caller number as a key, call permission determining means for determining the permission of a call of the caller based on the balance of the prepaid money, speech permissible time calculating means for calculating a speech permissible time by applying the number of the called terminal ("country number" and "area code" for example) inputted from the caller terminal and the balance of the prepaid money to the charge system of the communication company per called location, line connecting means for connecting the caller terminal with the called terminal via an exchange of the communication company, speech time measuring means for measuring the speech time between the caller terminal and the called terminal, line disconnecting means for forcibly disconnecting the speech channel between the caller terminal and the called terminal at the moment of time when the speech permissible time passes, telephone charge calculating means for calculating the telephone charge by applying the speech time to the charge system of the communication company per called location and balance updating means for subtracting the telephone charge from the balance of the prepaid money of the caller within the balance storage means.

Thus, the call is not permitted when the balance of the prepaid money of the caller is insufficient and the line is forcibly disconnected when no balance is left during the call. An amount of money corresponding to the telephone charge is paid from the prepaid money to the communication company later. That is, the communication company takes no risk of bad debt of the telephone charge as far as the call is made through this communication control system.

Therefore, the caller just needs to apply the caller number of own mobile communication terminal and to pay the prepaid money of certain amount or more and needs not to receive the rigid examination of the international communication company like the past in making an international call from the mobile communication terminal such as a portable telephone.

It is also possible to construct so as to record the charge systems of a plurality of communication companies per called location in the charge storage means of the charge system, respectively and to provide communication company specifying means for specifying one communication company based on a signal (specific dialing signal) inputted through the caller terminal so that the speech permissible time calculating means calculates the speech permissible time by applying to the charge system of the pertinent communication company per called location when the call is permitted by the speech permission determining means, the line connecting means connects the caller terminal with the called terminal via the exchange of the communication company and the telephone charge calculating means calculates the telephone charge by applying the speech time to the charge system of the communication company per called location.

As a result, the caller can freely select the communication company which is the most advantageous cost-wise among the plurality of communication companies depending on the time zone and the called country. An amount of money corresponding to the telephone charge is paid from the prepaid money to the selected communication company later.

Because each communication company takes no risk of causing bad debt of the telephone charge, the caller is not required to make a utility contract or to pay a deposit in advance per each communication company.

Although a certain process involving payment of cash is required in order to store the balance of prepaid money within the balance storage means as a matter of course, its complexity is much smaller than the case of making the contract and paying the deposit per each communication company.

Further, even when any communication company is selected, the telephone charge is unitarily cleared by reducing the balance of the prepaid money within the balance storage means, so that the payment management of the telephone charge is simplified.

Although the dialing signal, i.e., the specific number, needs to be inputted to specify one communication company, it can be done by properly using several patterns of numbers at most because this number is used to just discriminate the plurality of communication companies.

One communication company may be specified in the same time when the caller makes a connection by assigning a different number per each communication company as a telephone number inputted to connect to this communication control system from the caller terminal.

The caller is required to select the most advantageous communication company in the case described above because one communication company is specified among the plurality of communication companies as the communication company specifying means recognizes the specific dialing signal inputted from the caller terminal.

It is also possible to provide optimum communication company specifying means, instead of the communication company specifying means described above, which selects one communication company whose telephone charge is the lowest by applying the called number (country number)

inputted from the caller terminal and the current time and date to the charge system of each communication company.

As a result, one communication company whose telephone charge is the lowest in the current time zone is automatically selected and the convenience of the caller is further enhanced without inputting the number for selecting the communication company which has been judged to be the most advantageous by grasping the charge system per country (per region) and time zone per each communication company on the caller side.

It is supposed above that the subscriber contract of the mobile communication terminal as the caller terminal has been finished between the caller himself and the mobile communication company. That is, the person who already owns the mobile communication terminal is allowed to readily make an international call using the mobile communication terminal and to properly use the plurality of international communication companies.

Therefore, persons who cannot make the subscriber contract of the mobile communication terminal from the beginning, i.e., persons who have no address domestically or the minorities who has no guarantor, cannot use this communication control system.

However, the persons who have no credit and cannot make the utility contract of the mobile communication terminal can use this system by adding call restricting means for limiting the calling destination of the caller terminal only to the telephone number for connecting to this system.

The call utilizing this terminal is made always through this system by limiting the calling destination of the caller terminal to the telephone number for connecting to this system and its charge is always paid by the prepaid money within the balance database. That is, the risk of causing an unexpected telephone charge exceeding the balance of the prepaid money may be eliminated.

Therefore, it becomes possible for the system operator or the mobile communication company themselves to distribute the mobile communication terminals to which the above-mentioned call restriction is implemented to a large number of persons without examination. The persons who get the mobile communication terminals can make a call through this communication control system and the exchange of the mobile communication company after paying the prepaid money of certain amount or more.

It is noted that even though the call restricting means is provided, no trouble occurs in the speech thereafter because the caller is allowed to input the telephone number of the called terminal from the caller terminal and a speech channel is formed with the called terminal by the line connecting means after when the caller terminal is connected once to the communication control system, the balance is checked by the balance checking means and the speech is permitted: by the speech permission determining means.

While the communication control system described above has been what is related to the payment of telephone charge of a portable telephone, it may be advanced by one more step and may be applied to a payment of charges of mail-order sales utilizing communication lines.

That is, the system comprises balance storage means for storing an amount of prepaid money of the caller in correspondence to the caller number, merchandise storage means for storing information on merchandise to be sold by the mail-order sales, balance checking means for checking the balance of the prepaid money of the caller by searching the balance storage means by keying the caller number when the caller terminal is connected to the communication control system, amount calculating means for totaling purchase prices of the merchandise specified by the signals inputted from the caller terminal, means for determining whether or not the payment of the charge is possible by comparing the purchase price and the balance of the prepaid money and balance updating means for subtracting the price from the balance of the prepaid money when the payment of the charge is possible.

After completing the payment of the charge of the merchandise as described above, the merchandise provider sends the merchandise to the caller.

In this case, the merchandise provider takes no risk of causing a bad debt at all and can recover the charge reliably because the mail-order sales can be made within the range of amount prepaid by the caller. The callers also have advantages that they can save time for transferring the charge and can save the money transmitting fee and the substitutional payment fee.

BRIEF DESCRIPTION OF THE DRAWINGS

FIG. 2 is a table showing an example of data items within a balance database.

FIG. 4 is a table showing an example of data items within a charge database.

BEST MODE FOR CARRYING OUT THE INVENTION

Figure 1:
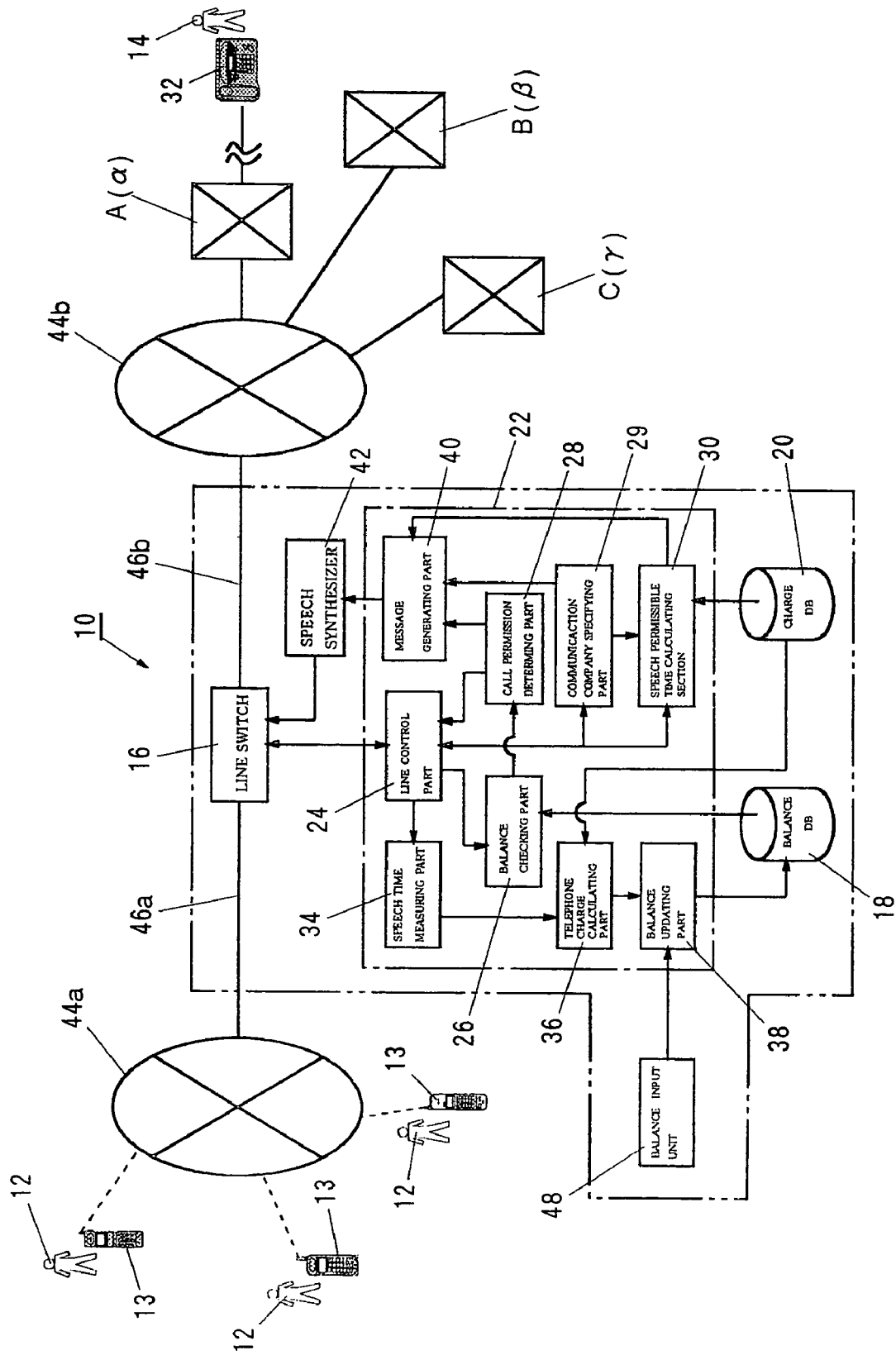
FIG. 1 is a block diagram showing a first communication control system according to the present invention.

FIG. 1 is a block diagram showing a first communication control system 10 according to the present invention.

This first communication control system 10 is interposed between a caller 12 and exchanges α through χ of a plurality of international communication companies A through C such as Kokusai Denshin Denwa (KDD), Japan Telecommunications (JT) and International Digital Communications (IDC) to connect/disconnect the line and to conduct processes for charging telephone charge between the caller terminal (portable telephone) 13 and a overseas called terminal 14 via the international communication companies A through C.

The communication control system 10 comprises a line switch 16 for connecting and disconnecting the line, a balance database 18 for storing balance data of prepaid money per each caller 12 registered in advance, a charge database 20 for storing information on a charge system per each called region of the communication companies A through C and a system center part 22 for operating the whole system.

The system center part 22 is composed of a CPU (central processing unit) of a computer system described later and is provided with the functional components as shown in the figure by executing a dedicated application program by the CPU.

That is, the system center part 22 comprises at least a line control part 24 for monitoring the line connection status and for driving and controlling the line switch 16, a balance checking part 26 for checking the balance of the prepaid money of each caller 12 by searching the balance database 18, a call permission determining part 28 for determining the permission of a call of the caller based on the balance of the caller, a communication company specifying part 29 for specifying one communication company selected by the caller 12 based on a specified number inputted through a caller terminal 13, a speech permissible time calculating section 30 for calculating a speech permissible time by collating charge data within the charge database 20 with the balance data, a speech time measuring part 34 for measuring the speech time in the same time when the line of the caller terminal 13 and the called terminal 32 is connected, a telephone charge calculating part 36 for calculating the charge by applying said speech time to the charge system within the charge database 20, a balance updating part 38 for updating the balance data within the balance database 18 and a message generating part 40 for generating a specific message signal.

The message signal generated by the message generating part 40 is transformed into a speech via a speech synthesizer 42 and is transmitted to the caller terminal 13 via the line switch 16.

In the communication control system 10, the balance database 18 corresponds to balance storage means, the charge database 20 corresponds to charge storing means, the balance checking part 26 corresponds to balance checking means, the call permission determining part 28 corresponds to call permission determining means, the communication company specifying part 29 corresponds to communication company specifying means, the speech permissible time calculating section 30 corresponds to speech permissible time calculating means, the speech time measuring part 34 corresponds to speech time measuring means, the telephone charge calculating part 36 corresponds to telephone charge calculating means and the balance updating part 38 corresponds to balance updating means, respectively. Further, the line switch 16 controlled by the line control part 24 corresponds to line connecting means and line disconnecting means.

A public line network 44a including a base station of the mobile communication terminal is interposed between the caller terminal 13 and the communication control system 10 and is connected with the line switch 16 via an ISDN line (INS1500) 46a for example.

A public line network 44b is also interposed between each international communication company A through C and the communication control system 10 and is connected with the line switch 16 via an ISDN line (INS1500) 46b for example.

Next, a method for actually operating the first communication control system 10 will be explained.

At first, an applicant who wants to use the communication control system 10 needs to open an account within the balance database 18 in advance and to register information on prepaid money balance in that account.

A table having items of Current Balance, Updated Date, Subscriber Name and others is prepared within the balance database 18 by keying with telephone numbers of portable telephones owned by the callers 12, that is, caller numbers as shown in FIG. 2.

This deposit balance information is newly registered as described below for example.
 (1) The applicant who wants to use the service writes own portable telephone number (caller number), name, address and an amount of prepaid money in a predetermined transfer sheet, not shown in the figure, and submits it to a banking organ or a convenience store together with cash.
 (2) The banking organ or the convenience store stamps a receipt stamp on a copy of the transfer sheet and the applicant transmits this copy to the operator of the communication control system 10 by FAX.
 (3) The system operator inputs the caller number, the amount of prepaid money, the name and others by using a balance input unit 48 (keyboard and the like). This input data is stored within the balance database 18 via the balance updating part 38.

The caller number and the balance information may be thus registered within the balance database 18 by the simple procedure without any preliminary examination and the applicant can use the communication control system 10 in the same time when the registration is completed, thus giving a big merit to the applicant.

Although the prepaid money must be paid before the registration, its nature is totally different from the conventional uniformly expensive deposit which must forcibly be paid in making the utility contract because the applicant sets the amount by himself.

It is noted that the applicant needs not always write own name and address in registering the balance information.

The processes (2) and (3) are not necessary if a computer composing an information management system of the banking organ or the convenience store is on-line connected with a computer composing the communication control system 10.

That is, at the moment when the data of caller number and the amount of prepaid money is inputted from the terminal of the banking organ or convenience store, they are automatically registered within the balance database 18 via the balance updating part 38 of the communication control system 10. Accordingly, it is possible to save the works of the applicant who transmits the copy by FAX and of the system operator who input the data.

In this case, the terminal of the banking organ or convenience store functions as a balance input unit 48.

The same method with what described above is basically used as described below in replenishing the balance.
 (1) The applicant writes an amount of prepaid money to be replenished in a transfer sheet which is issued by the system operator after the registration and on which at least the caller number of the registered person is printed in advance and submits it to the banking organ or convenience store together with cash.
 (2) The banking organ or the convenience store stamps a receipt stamp on a copy of the transfer sheet and the applicant transmits this copy to the operator of the system by FAX.
 (3) The system operator inputs the amount of prepaid money replenished by using the balance input unit 48 (keyboard and the like). This input data is stored within the balance database 18 via the balance updating part 38.

It is possible to save the works of the applicant who transmits the copy by FAX and of the system operator who input the update data also in the case of replenishing the balance if the computer composing the information management system of the banking organ or the convenience store is on-line connected with the computer composing the communication control system 10 because the data of replenished amount is automatically registered within the balance database 18.

It is also possible to arrange so as to issue a large number of transfer sheets on which the caller number and amount information are described by bar-code to the user who has been registered once so that the user submits the transfer sheet together with cash corresponding to the transfer sheet to the convenience store and so that the balance of the balance database 18 is automatically increased at the point of time when the bar-code is read by a bar-code reader. In this case, the bar-code reader functions as the balance input unit 48.

Or, it is also possible to arrange so as to paste a bar-code label showing the caller number to the caller terminal 13 and to complete the replenish of the balance when the bar-code is read by the bar-code reader and information on amount actually paid is inputted by a register terminal or the like.

The user whose prepaid balance information is registered within the balance database 18 as described above registers an abbreviated specific telephone number specified by the system operator to own portable telephone 13. This telephone number is what assured by the system operator in advance and is allocated to each international communication company A through C like "03-3555-5555 for KDD" and "03-3333-3333 for JT" for example. The user registers the abbreviated number of "01" for KDD and "02" for JT for example in advance.

Then, the user who has judged that it is most advantageous money-wise to use KDD to make a telephone call to the US. at the present time zone inputs the above abbreviated number "01". As a result, a speech channel is established with the communication control system 10 via the line switch 16.

Figure 3:
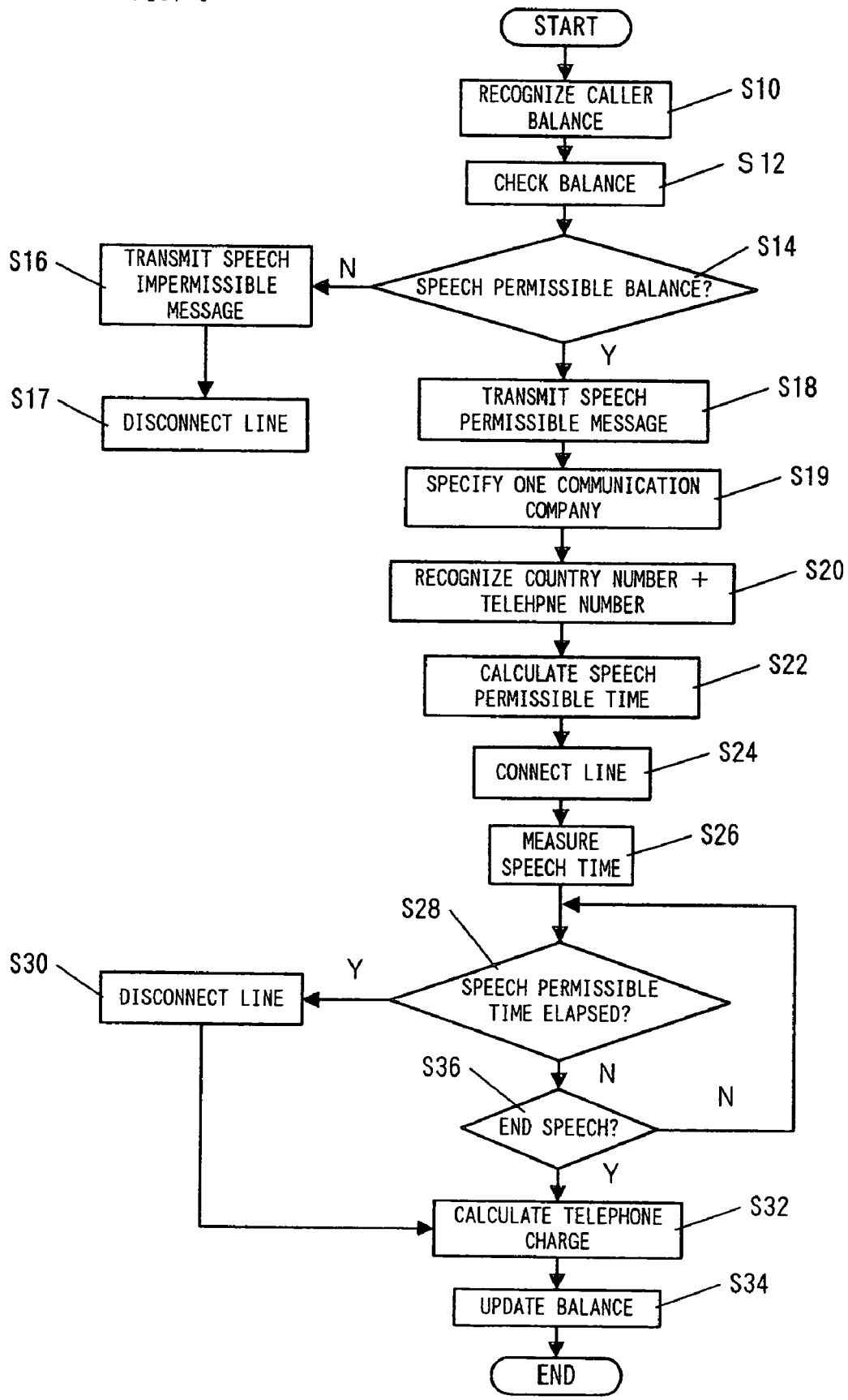
FIG. 3 is a flowchart showing the operating method of the first communication control system.

As shown in a flowchart in FIG. 3, the line control part 24 recognizes the caller number of the caller terminal 13 (S10) and sends it to the balance checking part 26. The data of the caller number is transferred from an exchange belonging to the public line network 44a of the caller side. Accordingly, the caller number informing service of NTT may be used for example.

With the keyword of the caller number, the balance checking part 26 searches the balance database 18 to check the current balance of prepaid money of the caller (S12).

The balance data checked here is sent to the call permission determining part 28. The call permission determining part 28 determines whether or not the balance is an amount which permits the call (S14). That is, when the balance is below an amount (15 yen for example) which has been set beforehand, the call permission determining part 28 determines as "speech is not permitted" and sends the result of determination to the line control part 24 and the message generating part 40.

The message generating part 40 generates a message signal of contents of "Unable to connect because short of balance" for example and outputs it to the speech synthesizer 42. Receiving the signal, the speech synthesizer 42 synthesizes a speech corresponding to the message signal and transmits it to the caller terminal 13 via the line switch 16 (S16). It is noted that it is desirable to arrange so as to generate the message signal corresponding to foreign languages such as Chinese, Korean and English, beside Japanese, and to transmit to the caller terminal 13 sequentially by transforming into a speech in each language by the speech synthesizer 42.

At the point of time when the transmission of the speech message is completed, the line control part 24 disconnects the line with the caller terminal 13 (S17).

When the balance of prepaid money exceeds a predetermined amount in contrary, the call permission determining part 28 determines as "speech permissible" and sends the result of determination to the line control part 24 and the message generating part 40.

The message generating part 40 generates a message signal of contents of "Speech is permissible by an amount of 1,000 yen. Input a country number and a telephone number of the called side" and outputs it to the speech synthesizer 42. The message which has been transformed into the speech by the speech synthesizer 42 is transmitted to the caller terminal 13 via the line switch 16 (S18).

The communication company specifying part 29 specifies the international communication company A which is desired by the caller 12 by the telephone number (abbreviated number: 01, i.e., "03-3555-5555") inputted at first from the caller terminal 13 to connect to the system 10 (S19).

When the caller 12 inputs a country number, an area code, a local station number and a subscriber number of the called side, the speech permissible time calculating section 30 recognizes the country number and others (S20), searches the charge database 20 with the keyword thereof and applies the balance to the charge system of the international communication company A to calculate a speech permissible time (S22).

Telephone charge unit cost information divided per country number and area code is stored within the charge database 20 per each international communication company A through C as shown in FIG. 4 (FIG. 4 shows a part of the charge system of the communication company A as one example).

Then, the communication company specifying part 29 specifies the international communication company A (S19) as described above and the unit cost of the telephone charge is determined from the inputted country number and the current time and date information. A concrete speech permissible time may be calculated by collating this unit cost with the balance.

For instance, the speech permissible time is 28 minutes when an international call is made to Argentina (country number: 54) on Sunday under the circumstance of 700 yen of balance.

It is noted that although the speech permissible time is determined only by the country number when the country number corresponds with the unit cost in one-to-one, the unit cost may be determined by country number+area code when one country number corresponds to a plurality of countries and regions.

When the speech permissible time is calculated as described above, this result is sent to the line control part 24 and the message generating part 40.

The message generating part 40 generates a message signal of contents of "Speech is permissible for 28 minutes. Connection will be made soon" and outputs it to the speech synthesizer 42. The speech synthesizer 42 synthesizes a speech corresponding to that and transmits it to the caller terminal 13 via the line switch 16.

After that, the line control part 24 generates a dialing signal corresponding to the international prefix number ("001", "0041", "0061" and the like) of the selected international communication company A+country number, area code, local station number and subscriber number of the called side and sends it to the public line network 44b via the line switch 16.

Then, at the point of time when the speech channel is established with the called terminal 32 via the exchange a of the international communication company A, the line switch 16 connects the line between the caller terminal 13 and the called terminal 32 (S24).

In the same time, the speech time measuring part 34 starts to measure the speech time (S26).

The line control part 24 always monitors the measured result of the speech time measuring part 34 and determines whether or not the speech permissible time has elapsed (S28).

When the speech permissible time has elapsed, the line control part 24 outputs a control signal immediately to the line switch 16 to forcibly disconnect the line between the caller terminal 13 and the called terminal 32 (S30).

The measured result of the speech time measuring part 34, i.e., the speech time, is outputted from the speech time measuring part 34 to the telephone charge calculating part 36. The telephone charge calculating part 36 calculates the actual telephone charge based on this speech time and the charge system stored in the charge database 20 (S32) and outputs it to the balance updating part 38.

The balance updating part 38 updates and registers an amount obtained by subtracting the above-mentioned telephone charge from the balance in the balance database 18, i.e., 0 yen, as new balance information (S34).

When the speech ends within the speech permissible time, i.e., when a conduct of disconnecting the line is carried out voluntarily between the caller side portable telephone 13 and the called terminal 32, the line control part 24 detects a disconnect signal (on-hook signal) (S36) and the speech time measuring part 34 stops to measure the speech time.

The speech time measured by the speech time measuring part 34 is outputted from the speech time measuring part 34 to the telephone charge calculating part 36. The telephone charge calculating part 36 calculates the actual telephone charge based on this speech time and the charge system stored in the charge database 20 (S32) and outputs it to the balance updating part 38.

The balance updating part 38 updates and registers an amount obtained by subtracting the above-mentioned telephone charge from the balance in the balance database 18 as new balance information (S34).

It is noted that instead of calculating the telephone charge collectively after ending the speech as described above, it is also possible to operate the telephone charge calculating part 36 so that it accumulates the telephone charge in the same time with the start of the speech based on the output from the speech time measuring part 34 and on the charge system described above.

There is a case when the telephone charge of the international communication company B is lower than that of the international communication company A depending on the time zone and the called country. In such a case, the caller 12 inputs another telephone number assigned to the international communication company B to connect with the first communication control system 10. The communication company specifying part 29 recognizes that the international communication company B has been selected by the dialed telephone number and then realizes the international call via the international communication company B with the same procedure described above.

Although the caller 12 is required to properly use a plurality of telephone numbers corresponding to the usable international communication companies A through C, it does not take much time because the telephone numbers themselves are abbreviated and registered in the portable telephone 13 beforehand as described above.

It is also possible to arrange so as to create a warning of contents of "Speech time ends in one minute", not disconnecting the line suddenly at the point of time when the speech permissible time has elapsed as described above, by the message generating part 40 and the speech synthesizer 42 and to send it to the caller terminal 13 via the line switch 16.

Or, it is also possible to operate flexibly so as to record an amount of telephone charge exceeding the balance in the balance database 18 as minus balance within a certain limit, instead of disconnecting the line, and to adjust the previous minus balance when the balance is replenished in the next time.

The international telephone charge caused by the use of the first communication control system 10 is billed later from each one of the international communication companies A through C to the system operator. The system operator appropriates the prepaid money of the caller 12 which has been transferred to its own bank account through the banking organ or the convenience store to this payment.

It is also possible to operate so as to collect a fee from the balance at a certain rate every time when the caller 12 uses this communication control system 10. For instance, it is possible to assure a difference between the reduction of the balance and the payment to the international communication company as a fee by putting a certain amount of fee on the charge system of each communication company in the charge database 20 from the beginning and by calculating the speech permissible time and the telephone charge based on the put-on fee.

History data of time and date when calls have been made, names of the used international communication companies, called side numbers, speech time, telephone charge, balance replenishing time, replenished amount and others are stored per each caller number within the balance database 18 or in the other independent database.

It is then possible to collect the history data per certain period, e.g., every month, and to issue a detailed statement in which necessary data items are printed to users.

The caller 12 can get the following merits by using the communication control system 10.

(1) It becomes possible to properly use the plurality of international communication companies just by registering the caller number and others of the own portable telephone 13 in one place (balance database 18). That is, the caller can select the company whose telephone charge is the lowest corresponding to the time zone and called country without making a utility contract with each international communication company or without buying a plurality of kinds of prepaid cards per international communication company like the past.

(2) The charge can be managed at one place and it becomes unnecessary to pay any telephone charge or guarantee fee to each of the plurality of international communication companies like the past.

(3) The connection can be made just by inputting the normal telephone number (local station number+subscriber number) to connect to the communication control system 10 before inputting the called side number (country number, area code, local station number and subscriber number) and it becomes unnecessary to input a long card number like the prepaid card. Still more, because the above telephone number is determined per international communication company, an access can be made by very short input operations by properly using a few kinds of numbers and by using a abbreviated dialing function normally provided in the portable telephone 13 (in case of a prepaid card, it is unrealistic to abbreviate and register the card every time when the card is bought because a different card number is assigned to each card).

(4) The caller can make a relatively long speech without thinking about time by assuring an enough balance by prepaying an enough amount of money. The caller can receive the return of the balance in canceling the contract before using the balance.

The international communication company can also get the following merits from the communication control system 10.

(1) The international communication company only needs to make a contract with the operator of the communication control system 10 and needs not to make a utility contract with the portable telephone users individually. Therefore, it is possible to remarkably reduce the cost for managing a large number of end users.

(2) Because the operator of the communication control system 10 collects the telephone charge instead of the international communication company, no bad debt of the telephone charge occurs and the international communication company can devote to the provision of the services without anxiety.

(3) Because no prepaid card needs to be issued, the cost required for its issuance, transfer and storage may be reduced.

As described above, the use of the communication control system 10 allows the telephone charge for the user of the communication control system 10 to be discounted because the international communication company can expect a large cost reduction effect.

Figure 5:
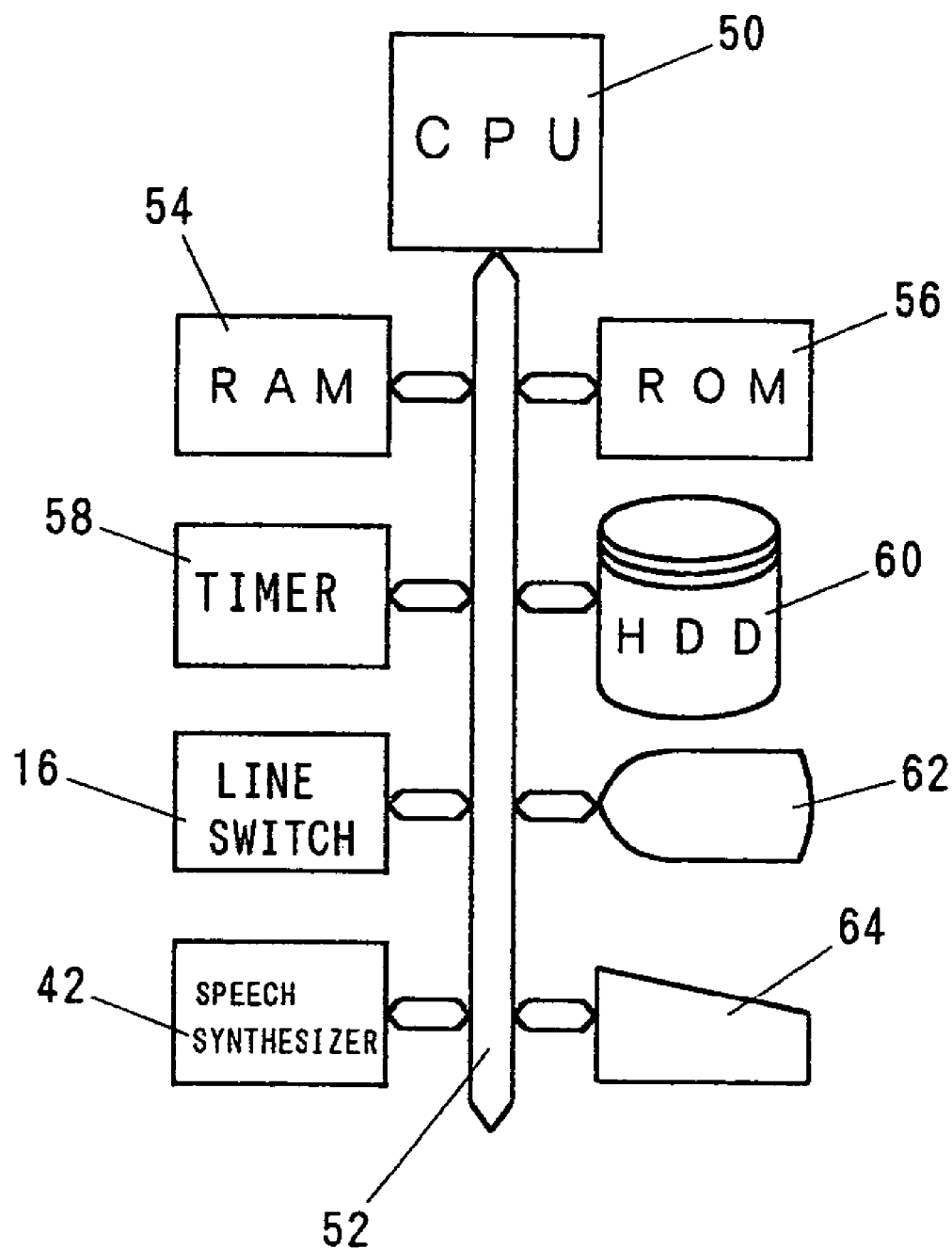
FIG. 5 is a block diagram showing a structural example of the hardware of the first communication control system.

The communication control system 10 is constructed centering on a computer system such as a main frame, workstation and personal computer (hereinafter called "personal computer") FIG. 5 shows an example of the communication control system 10 constructed centering on the personal computer and comprising a CPU (central processing unit) 50 and a RAM 54, a ROM 56, a timer 58, a harddisk unit 60, the line switch 16, a display 62, the speech synthesizer 42 and an input unit 64 such as a keyboard connected with the CPU 50 via a system bus 52.

Application programs and an OS (operating system) for operating the communication control system 10 are stored within the harddisk unit 60 and the CPU 50 equips the various functional components such as the line control part 24, the balance checking part 26 and the call permission determining part 28 described above by activating those software.

The balance database 18 and the charge database 20 are stored in the harddisk unit 60.

The balance database 18 and the charge database 20 need not be always constructed by one storage unit and may be constructed by combining a plurality of storage units.

A timer circuit built in the timer 58 provides the data of current time and date to the communication control system 10, so that the speech permissible time may be calculated and the speech time may be measured.

It is noted that the hardware structure described above is one example to the end and the present invention is not limited to that.

For instance, the communication control system 10 may be realized by connecting a plurality of personal computers by LAN (Local area network) and by distributed processing. In this case, each functional component of the communication control system 10 is allocated to the plurality of personal computers. For example, the line switch 16 is connected to a personal computer A to provide the functions of the line control part 24 and the speech time measuring part 34, the balance database 18 is connected to a personal computer B to provide the functions of the balance checking part 26, the call permission determining part 28 and the balance updating part 38 and the charge database 20 is connected to a personal computer C to provide the functions of the speech permissible time calculating section 30 and the telephone charge calculating part 36.

It is desirable to provide access points within the country as many as possible because the domestic telephone charge from the caller portable telephone 13 to this system 10 is charged to the caller 12 in principle in using the communication control system 10.

However, it is suitable to manage the balance database 18 and the charge database 20 unitarily at the center.

Then, this system 10 may be realized by placing the access points provided with the line switch 16 and the functional components required for the control of lines at various place of the country, by placing the balance database 18 and the charge database 20 at the center and by networking the access points at various places with the center through a dedicated line.

Although the portable telephone 13 has been cited as the caller side terminal above, the present invention is not limited to that and the caller side terminal may be a fixed type telephone set, a personal computer equipped with a communication function and a portable information terminal (PDA) and the like. The called terminal 32 is not also limited and may be a portable telephone beside a fixed type telephone set, a personal computer equipped with a communication function, a portable information terminal (PDA) and the like.

Internet may be also interposed between the caller side terminal and the called side terminal.

The system may be simplified so as to realize an international call via one international communication company set in advance without selecting one among the plurality of international communication companies A through C.

In this case, it is possible to prevent a bad debt of telephone charge from occurring, though it is unable to freely select the international communication company whose charge is most advantageous. Therefore, it may be expected that an international call can be made from a portable telephone without rigid examination.

Although the case of making an international call via the exchanges a through γ of the international communication companies A through C has been supposed in the above description, it is of course possible to apply the first communication control system 10 in making a domestic call via the exchange of the domestic communication company.

In this case, the caller 12 can get the merits of being able to freely select and use the most advantageous communication company among a plurality of domestic communication companies and of being able to centralize the payment of charge. The domestic communication company can also get the merit of being able to collect the telephone charge steadily.

Although the method of opening own account in the balance database 18 and of increasing the balance by bringing cash to the convenience store and the like has been explained above, it is also possible to use own credit card instead of bringing cash.

That is, a mutual utility contract is made in advance between the operator of the communication control system 10 and the outside card company.

The caller 12 who has the credit card issued by the card company makes a call to the operator of the system 10 to tell the registered name of the credit card, a card number, expired date and a desired amount of prepaid money.

The system operator transmits this data to the card company via a telephone and a computer on-line system to inquire the credit. When the card company gives an affirmative answer, the amount of prepaid money is inputted immediately to the balance database 18 so that the communication control system 10 can be used.

This amount of prepaid money is transmitted to the system operator from the card company later.

It is convenient for the caller 12 who has a credit card if the prepaid money can be paid by using the credit card because it becomes unnecessary to bring cash to the convenience store and the like.

Although the case in which the caller number is automatically recognized at the point of time when the portable telephone 13, i.e., the caller side terminal, is connected to the system 10 has been shown above, it is also possible to operate so that the caller 12 himself input the caller number.

At first, as a presupposition, the caller 12 registers the caller number of own portable telephone 13 and a password number, e.g., a combination of numbers around four digits, associated with this caller number in the balance database 18 of the communication control system 10.

Next, the caller 12 connects to the line of the communication control system 10 from an arbitrary terminal. This line number has been informed to the caller 12 in advance as a dedicated line in manually inputting the caller number.

By being connected to this line number, the communication control system 10 judges that the caller 12 wants to manually input the caller number and transmits a speech message for urging to input the caller number and the password number.

Then, the caller 12 inputs own caller number and password number by pushing push buttons of the terminal.

The system side compares the transmitted dialing signal with the data of caller number and password number stored in the balance database to determine the correctness of the caller 12.

When they coincide, the system assumes it as an access from the correct caller and permits a speech using the communication control system 10.

When they do not coincide, the system assumes it as an incorrect access and disconnects the line.

This arrangement has a merit that the own prepaid account may be used for the payment of the telephone charge even when a connection is made to the communication control system 10 from a telephone other than the portable telephone 13 whose caller number has been registered in the balance database 18.

For instance, when the caller has left the portable telephone 13 in own house, the caller inputs own caller number and password number which have been registered in the balance database 18 after connecting to the communication control system 10 from the outside public telephone by inputting the telephone number for manual input of the caller number. Then, a speech can be realized with the called terminal 32 via the similar processes described above, such as the check of the balance executed by the balance checking part 26 and the determination whether or not the speech is permissible executed by the call permission determining part 28, and the telephone charge is drawn from the balance database 18.

Although the caller 12 has been required to select the most advantageous international communication company and to connect to the system 10 by inputting the telephone number allocated to that international communication company in the case described above, it is also possible to arrange so-that the communication control system has the function of automatically selecting the most advantageous international communication company at the current time zone.

Figure 6:
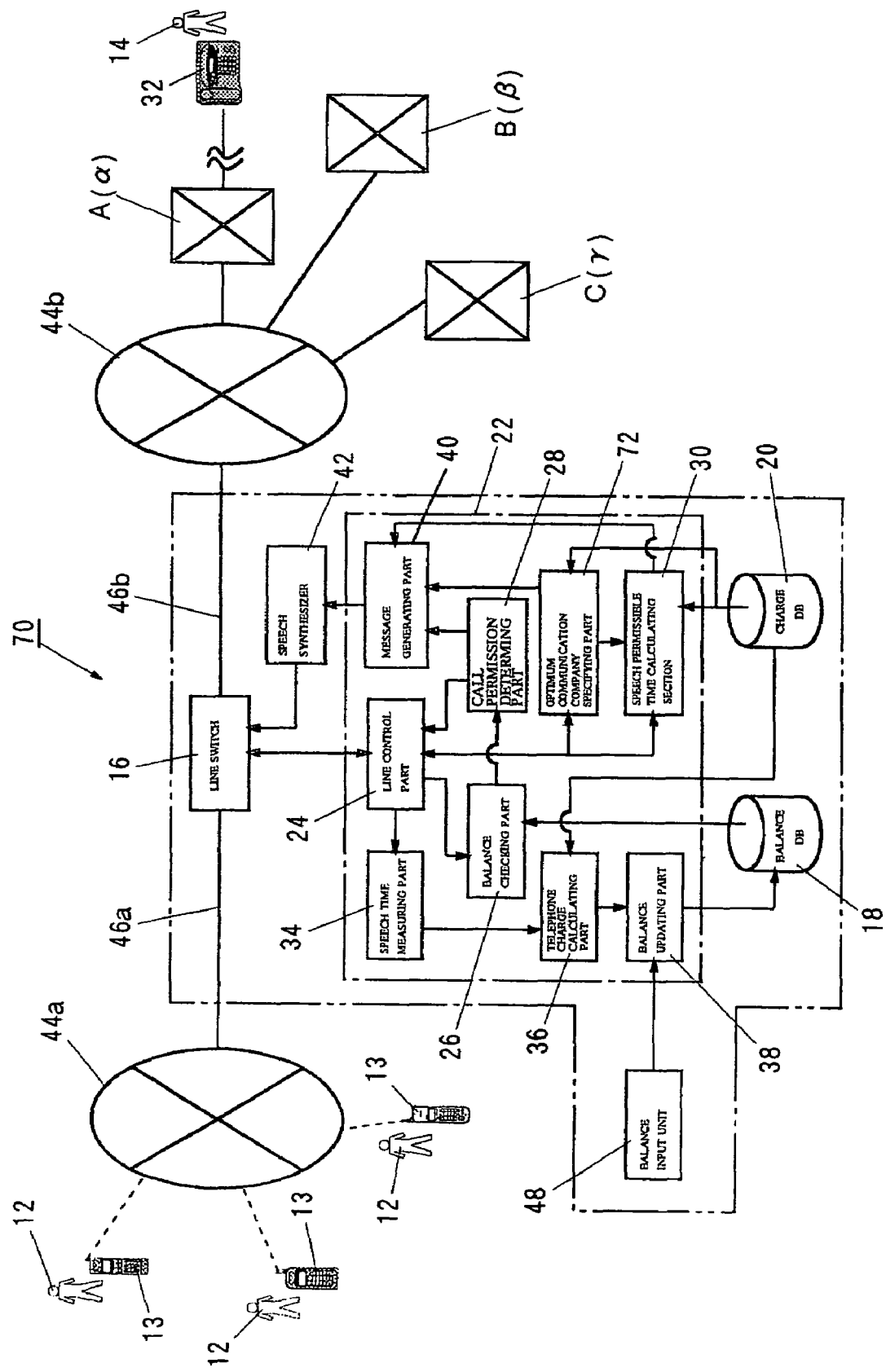
FIG. 6 is a block diagram showing a second communication control system of the present invention.
Figure 7:
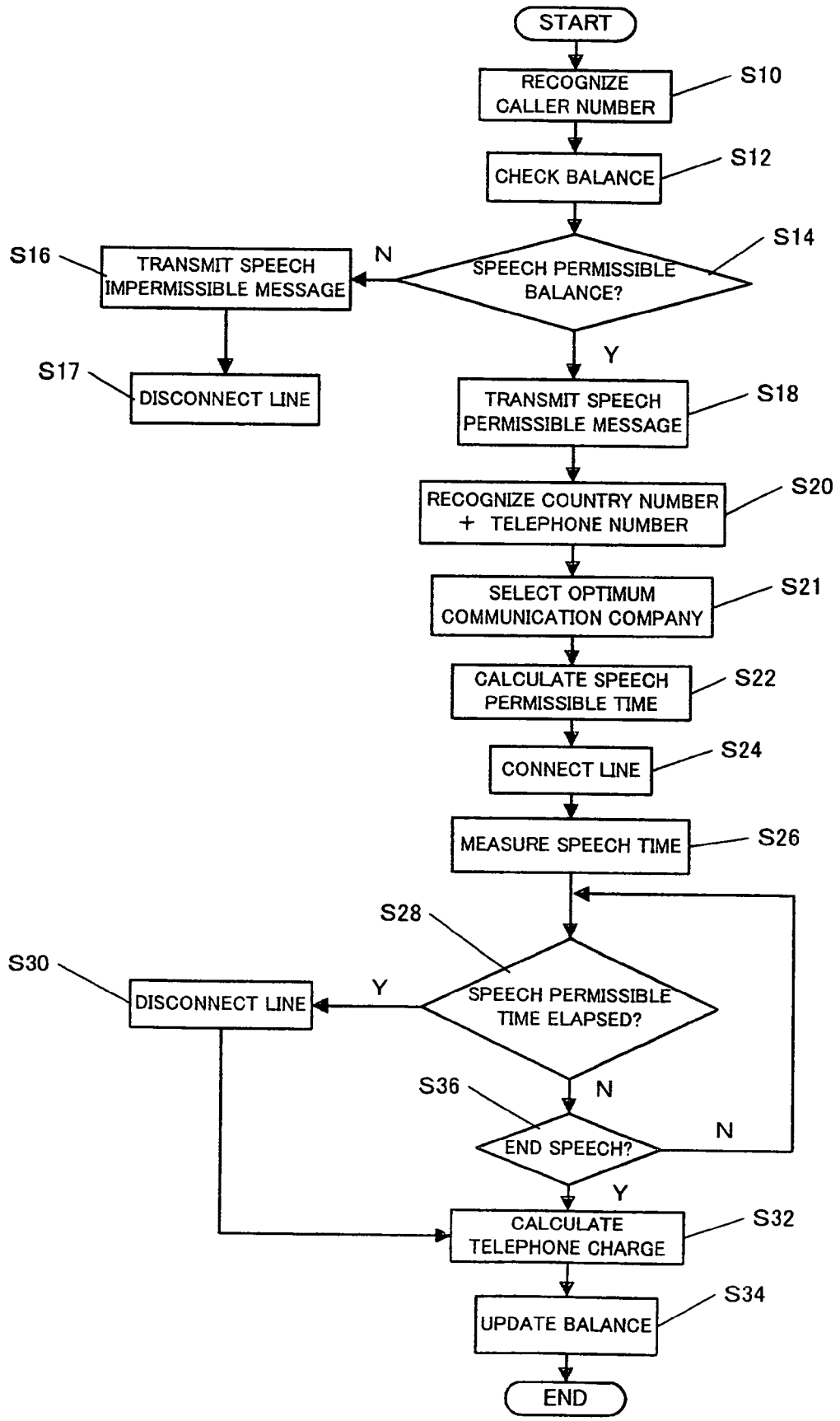
FIG. 7 is a flowchart showing the operating method of the second communication control system.

FIG. 6 is a block diagram showing a second communication control system 70 which is one example thereof and FIG. 7 is a flowchart showing its operating method. It is noted that the components similar to those in the first communication control system 10 and its operating method will be denoted by the same reference numerals and an explanation thereof will be omitted here.

In the first communication control system 10 described above, the communication company specifying part 29 has recognized that the international communication company corresponding to the telephone number had been selected based on the telephone number dialed by the caller 12 and the speech permissible time calculating section 30 calculated the speech permissible time based on the charge system of that communication company.

However, in the second communication control system 70, a pilot number is informed to the caller 12 instead of allocating a telephone number to each communication company. Then, when the caller 12 dials the pilot number and is connected with the line of this system 70, the check of the balance (S12), the determination whether or not the call is permissible (S14) and others end. Then, after when the dialing signal showing the country number, area code, local station number and subscriber number of the called side 14 are transmitted (S20), the most advantageous international communication company is automatically selected by an optimum communication company specifying part 72 (S21).

Because the database information of the charge system of each of the international communication companies A through C is stored in the charge database 20, the international communication company, e.g., the international communication company A, whose telephone charge is the lowest may be found based on the current time and date data by specifying the country and region of the called person 14.

Next, the speech permissible time calculating section 30 calculates the speech permissible time by applying the balance data to the charge system of the international communication company A selected as described above (S22).

The line control part 24 generates a dialing signal corresponding to the international prefix number of the selected international communication company A and the country number, area code, local station number and subscriber number of the called side and outputs it to the public line network 44b via the line switch 16.

Then, at the point of time when the channel is established with the called terminal 32 via the exchange a of the international communication company A, the line switch 16 connects the line of the caller side portable telephone 13 and the called terminal 32 (S24).

Thereafter, the same steps in the case of the first communication control system 10 are carried out.

It is also possible to introduce a payment method by credit card beside the prepaid payment to the first communication control system 10 described above.

Figure 8:
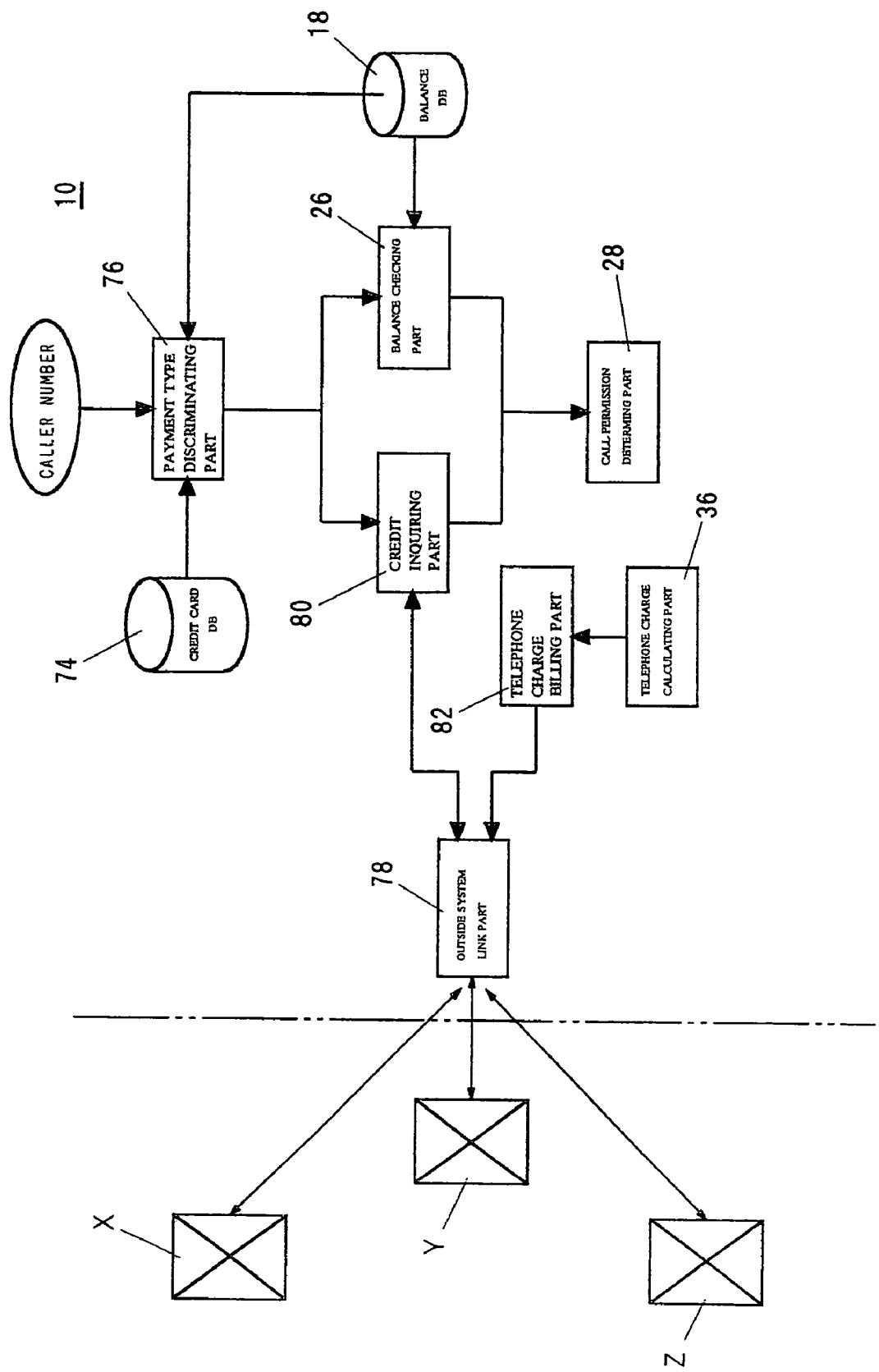
FIG. 8 is a block diagram showing an example in which a credit card payment function is added to the first communication control system.
Figure 9:
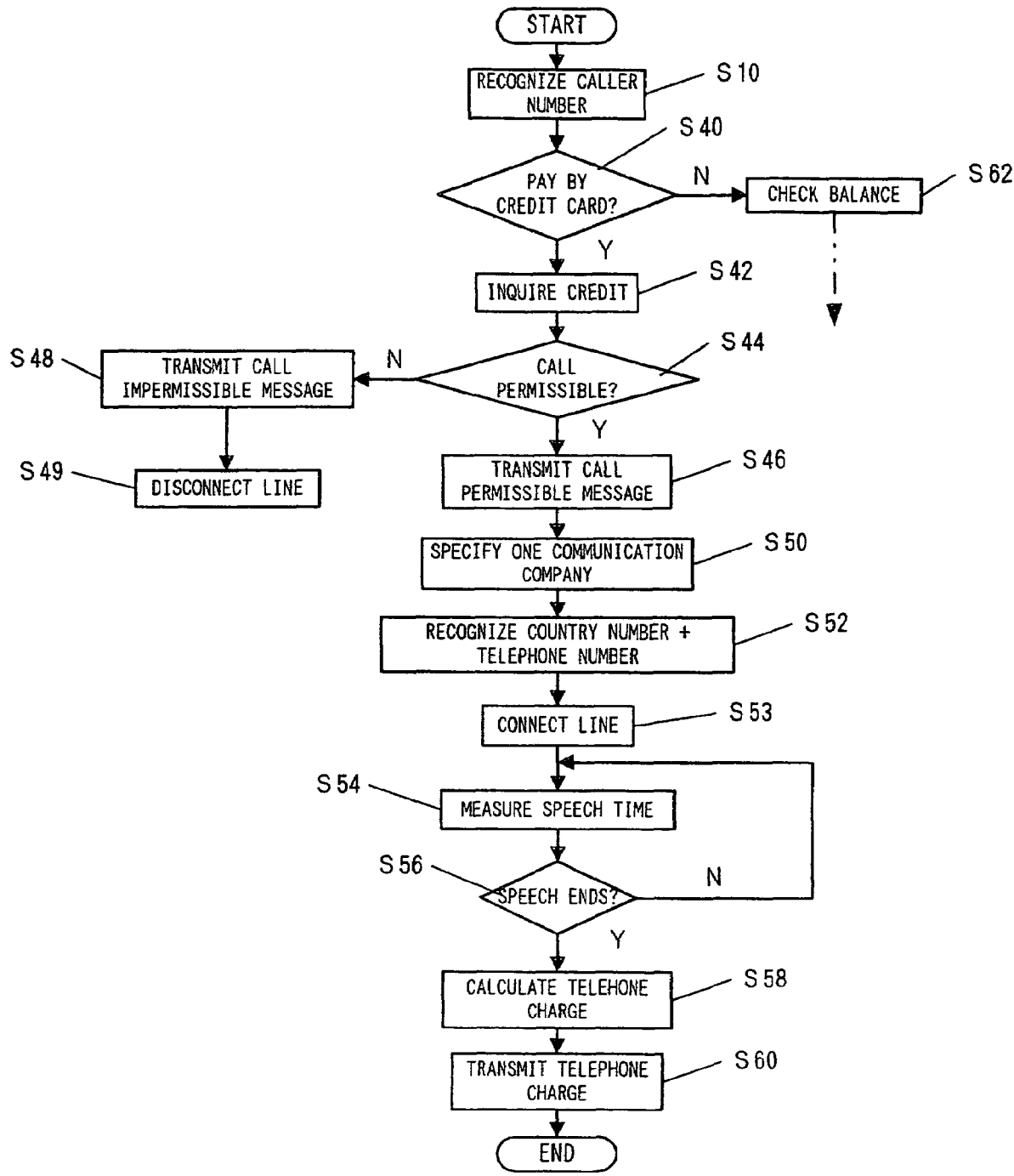
FIG. 9 is a flowchart showing the operating method of credit card payment.

FIGS. 8 and 9 show one example thereof and the following arrangement is added to the first communication control system 10.

That is, the communication control system 10 comprises a credit card database 74 for storing information on the credit card of the caller 12 in correspondence to the caller number, a payment type discriminating part 76 for retrieving the credit card database 74 and the balance database 18 when a connection is made from the caller side portable telephone 13 by keying the caller number to discriminate whether the caller 12 is a person who selects the credit card payment or a person who selects the prepaid payment, a credit inquiring part 80 for inquiring the credit of the caller 12 when the caller 12 is the person who selects the credit card payment by transmitting his/her credit card information to computer systems X through Z managed by a card company via an outside system link part 78 which executes an interface function with the outside systems and a telephone charge billing part 82 for transmitting a telephone charge calculated after ending the call to the computer systems X through Z via the outside system link part 78.

Although the communication control system 10 naturally comprises, beside them, the line switch 16, the charge database 20, the speech synthesizer 42, the line control part 24, the balance checking part 26, the call permission determining part 28, the communication company specifying part 29, the speech permissible time calculating section 30, the speech time measuring part 34, the telephone charge calculating part 36, the balance updating part 38, the message generating part 40 and others, FIG. 8 shows the system centering on the parts related to the credit card payment.

Next, the operating method of the credit card payment will be explained.

At first, a person who wants to pay by a credit card shows his intent to the system operator and states information (name of card company, registered name, card number, expire date and others) on own credit card.

The system operator stores such information in the credit card database 74 in connection with the caller number.

When the caller connects to the communication control system 10 via own portable telephone 13, the line control part 24 recognizes the caller number of the portable telephone 13 (S10) and sends it to the payment type discriminating part 76.

The payment type discriminating part 76 searches the credit card database 74 with the keyword of the caller number to check whether or not the caller 12 has been registered as a person who selects the credit card payment (S40).

When the caller has been registered as the person who selects the credit card payment, the credit card information (code specifying the company name, credit card number, expire date and others) of the caller 12 is sent to the credit inquiring part 80.

The credit inquiring part 80 specifies one card company from the credit card information and transmits the data such as the credit card number to the computer system, e.g., X, managed by the card company via the outside system link part 78 to inquire the credit status of the caller (S42).

The result of inquiry from the computer system X is transmitted to the call permission determining part 28 via the outside system link part 78 and the credit inquiring part 80. When the result of inquiry is affirmative, the call permission determining part 28 determines to permit the call using this system (S44). Then, it transmits a message saying that the call is permitted and urging to input the country number and the telephone number of the called side to the caller terminal 13 (S46).

When the result of inquiry is negative in contrary, it determines that the call is impermissible (S44), transmits a message telling about that to the caller terminal 13 (S48) and disconnects the line (S49).

The communication company specifying part 29 specifies the international communication company A desired by the caller 12 by the telephone number inputted from the portable telephone 13 of the caller to connect to the system 10 (S50).

When the caller 12 inputs the country number, area code, local station number and subscriber number of the called side, the line control part 24 recognizes it (S52), generates a dialing signal corresponding to the international prefix number of the selected international communication company A +the called country number+area code+local station number +subscriber number and sends it to the public line network 44b via the line switch 16.

Then, at the moment when the speech channel with the called terminal 32 is established via the exchange α of the international communication company A, the line switch 16 connects the line between the caller terminal 13 and the called terminal 32 (S53).

In the same time, the speech time measuring part 34 starts to measure its speech time (S54).

When the speech ends, i.e., when a spontaneous line disconnecting action is carried out between the caller terminal 13 and the called terminal 32, the line control part 24 detects a disconnection signal (on-hook signal) (S56) and the speech time measuring part 34 stops to measure the speech time.

The speech time measured by the speech time measuring part 34 is outputted to the telephone charge calculating part 36. The telephone charge calculating part 36 calculates the actual telephone charge based on this speech time and the charge system of the international communication company A stored within the charge database 20 (S58) and outputs it to a telephone charge billing part 82.

The telephone charge billing part 82 transmits data pertinent to this telephone charge to the computer system X of the card company via the outside system link section 78 (S60) and charges to pay the telephone charge by the credit card.

When the payment type discriminating part 76 determines that the caller number is not registered as paying by the credit card as a result when it searches the credit card database 74, its determined result is sent to the balance checking part 26 (S40).

The balance checking part 26 searches the balance database 18 and checks whether or not the caller is a person has selected to pay by the prepaid money (whether or not the balance of prepaid money corresponding to that caller number is registered) and checks the balance of the prepaid money when it is registered (S62). The process for the person who has selected to pay by the prepaid money is carried out sequentially following to the steps shown in the flowchart in FIG. 3.

The person who wants to pay by the credit card can also use this system 10 by introducing the credit card payment method beside the prepaid payment to the communication control system 10, thus enhancing the use value of the whole system.

Although the case of alternatively separating the persons who select to pay by the credit card and the persons who select to pay by the prepaid money has been shown above, the same caller 12 may be registered as the both persons who selects to pay by the credit card and who selects to pay by the prepaid money.

In this case, it is possible to arrange so that the caller can freely select every time when a call is made whether the credit card payment is made or the prepaid payment is made based on a specific dialing signal inputted from the caller side portable telephone 13 (for instance, "#1" denotes the prepaid payment and "#2" credit card payment).

As a result, it becomes possible to make a call by switching to the credit card payment when the caller who normally uses the prepaid payment is in short of the balance temporarily.

Although the case of adding the credit card payment function to the first communication control system 10 has been described above, it is possible to add the credit card payment function to the second communication control system 70 by providing an optimum communication company specifying part 72 instead of the communication company specifying part 29.

It is also possible to advance the above-mentioned system which subtracts the telephone charge from the amount of prepaid money of the balance database 18 by one step further to utilize as a charge payment system of mail-order sales and the like.

Figure 10:
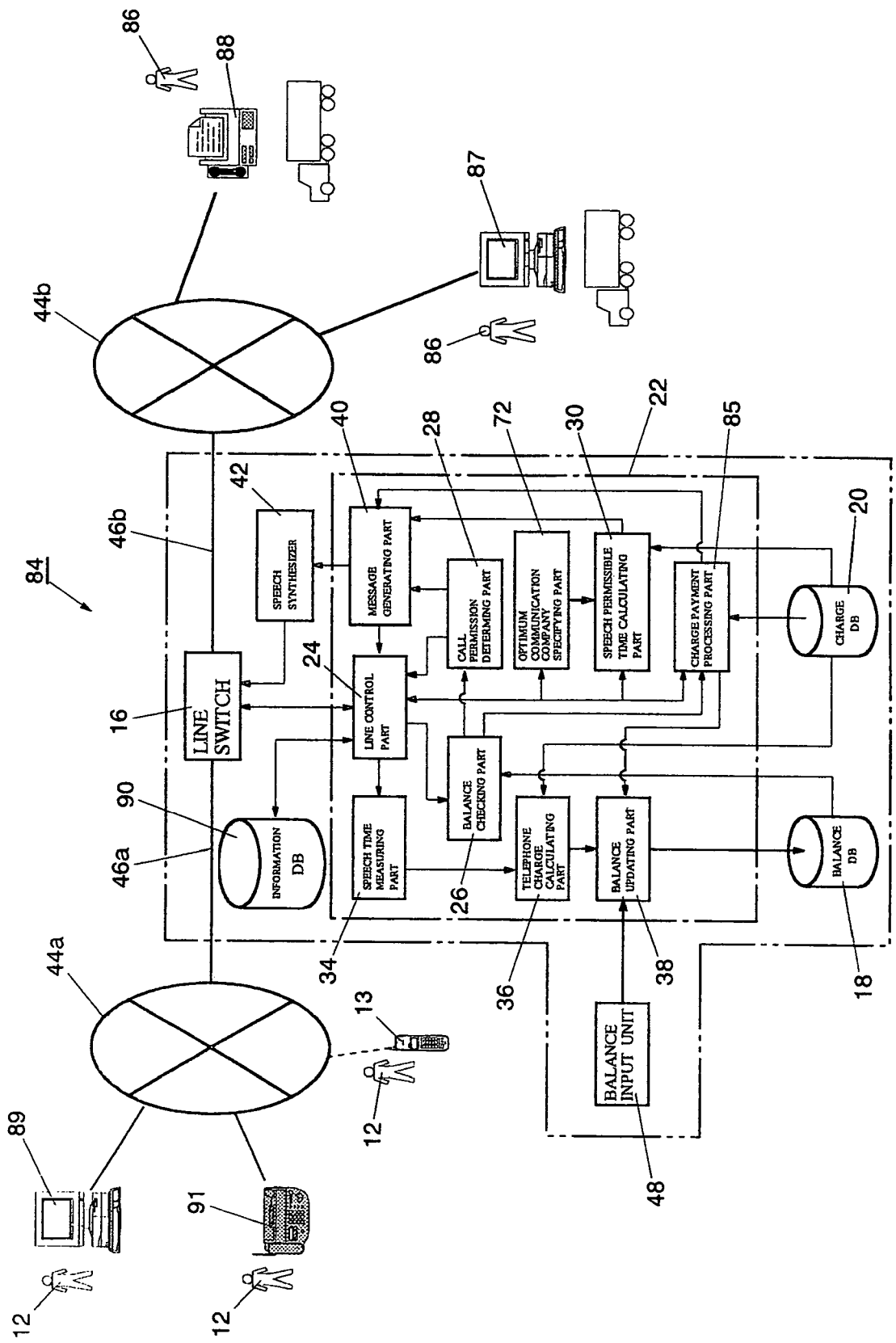
FIG. 10 is a block diagram showing a third communication control system according to the present invention.

FIG. 10 shows one example thereof and the system center part 22 of a third communication control system 84 is provided with a charge payment processing part 85 for determining whether or not to permit the charge payment using this system 84 and for executing various processes involving the charge payment.

Data concerning to merchandise (article name, maker name, type, article code, where to order, price, stock condition, date of delivery, etc.) handled by this system 84 is stored in the charge database 20. Such data may be also stored in other independent database (article information database) as a matter of course.

The caller 12 who wants to pay the charge of mail-order sales by utilizing this system registers the place where to deliver the merchandise, such as own address, in the balance database 18 in advance.

A catalog on which the name, code number, price and others of the merchandise handled by this system 84 are printed, is distributed to the caller 12 in advance.

The caller 12 connects to this system 84 by calling from own portable telephone 13 and the like at first.

Figure 11:
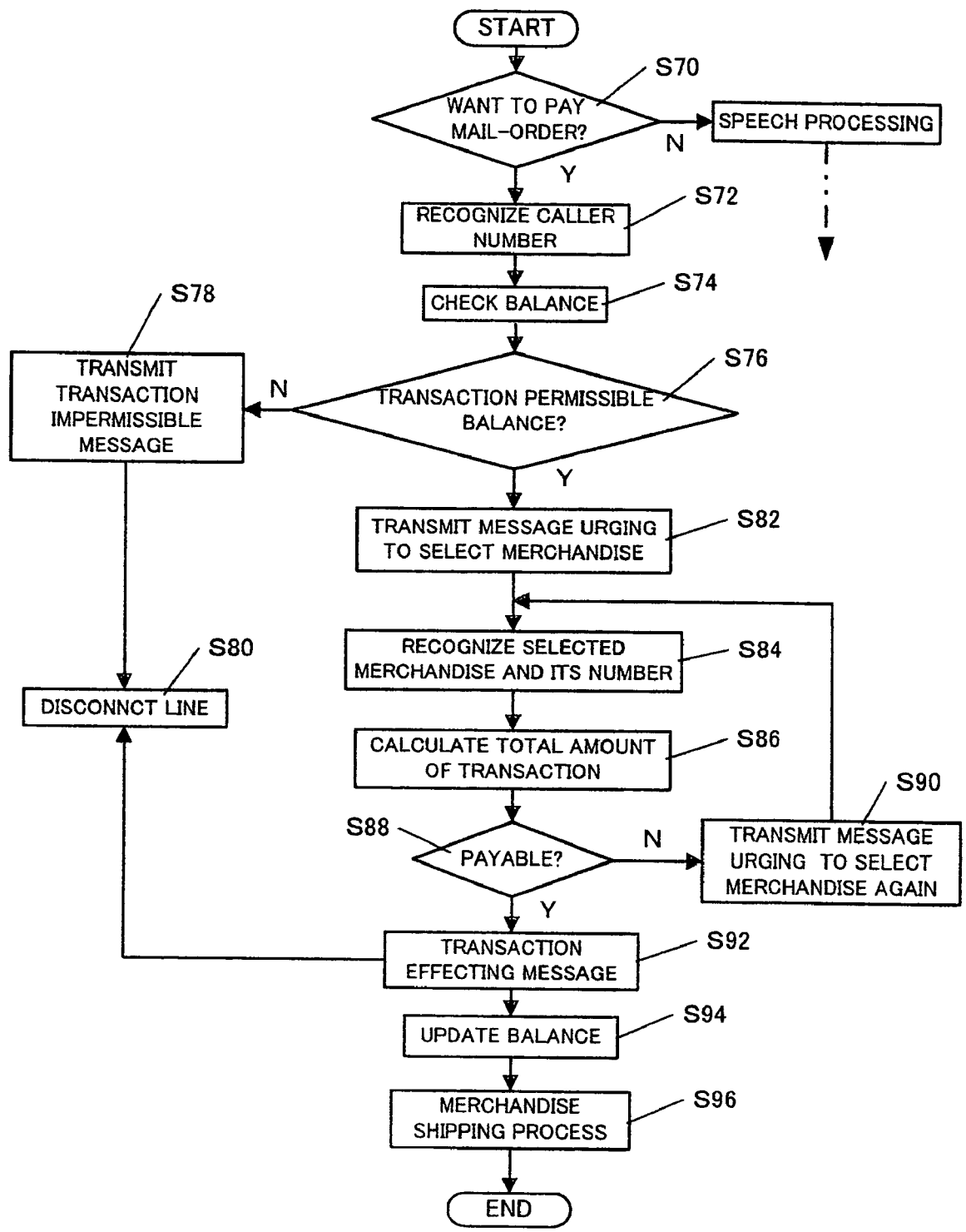
FIG. 11 is a flowchart showing the operating method of the third communication control system.

At this time, it is possible to recognize as "Desires payment of mail-order sales" in the same time with the connection as shown in FIG. 11 by preparing a number for the mail-order sales only (free dial number which is free of telephone charge for example) which is different from the telephone number in making a normal international call and by causing the caller 12 who desires the mail-order sales to input this telephone number for mail-order sales (S70).

It is of course possible to arrange so that the caller selects the mail-order sales by inputting a specific discriminatory signal (e.g., "#5") after connecting by the same number with the international call.

When the connection desiring the payment of mail-order sales is made, the line control part 24 recognizes the caller number (S72) and sends it to the balance checking part 26. The balance checking part 26 searches the balance database 18 by using the caller number as the keyword to check the balance of the caller 12 (S74).

Then, when the balance checking part 26 determines that the balance falls below a certain amount (e.g., 100 yen) (S76), it transmits a speech message saying that it is unable to have a transaction because of the insufficient balance to the caller (S78) and then disconnects the line (S80).

When the balance exceeds the certain amount of money however, it transmits a merchandise selecting message urging the caller to input the code number and a number of the desirable merchandise (S82).

The caller selects the desirable merchandise from the merchandise catalog and inputs its code number and the number by pressing the dial buttons of the portable telephone 13. For instance, the caller inputs as "5566*2" in buying two personal computers whose code number is 5566.

The charge payment processing section 85 searches the charge database 20, recognizes the merchandise, i.e., "personal computer", corresponding to "5566" and returns a confirmation message saying "Press # if you want two personal computers PC99DE-225 manufactured by A company. Input again if it is wrong" by speech.

When the caller 12 transmits a dialing signal ("#") denoting that it is correct, the system recognizes the selected merchandise and its number (S84) and the charge payment processing part 85 calculates a total amount of the transaction (unit cost of merchandise×number+tax+carriage) (S86) and compares that amount with the balance (S88).

When it is determined that the balance is insufficient, the system transmits a speech message saying "the balance is insufficient by 5,000 yen. Repeat again from the beginning" (S90).

When the balance exceeds the total amount of transaction however, the system transmits a speech message telling about that the transaction is effected saying "Your order is accepted. The total amount is 300,500 yen. The balance is left by 500 yen. The merchandise will arrive at October 10" (S92) and disconnects the line (S80).

After that, the balance updating part 38 updates the balance by subtracting the amount of charge described above from the balance data in the balance database 18 (S94).

The order of the merchandise accepted as described above is transmitted to the outside mail-order company (consignee) 86 by appropriate means and a process for shipping it to the address of the caller 12 is carried out (S96).

For instance, a connection is made to a computer system 87 managed by the mail-order company 86 via a telephone number to transmit a data signal corresponding to the contents of the order generated by the message generating part 40 and others. The data signal may be transmitted via a dedicated line or Internet as a matter of course.

It is also possible to collect the orders per each mail-order company per certain period (e.g., "once a day") and to transmit ordering sheets to a facsimile unit 88 of the mail-order company 86.

The system operator pays the charge of the merchandise to each mail-order company 86 later.

The use of the mail-order sales payment processing system described above brings about the following merits.

At first, because the balance of prepaid money is appropriated reliably to the payment of the merchandise, the company (mail-order company 86) who provides the merchandise takes no risk of causing a bad debt and can devotes to the transaction in ease.

The caller 12 also has a merit that it is possible to save the time for visiting a banking organ to transmit money after purchasing the merchandise and to save the substitutional payment fee.

It is noted that although this charge payment system is advantageous in that the balance of prepaid money may be checked very easily because the system searches the balance database 18 based on the caller number automatically sent when the caller 12 makes a connection, there is a risk that a third person who pretends that caller accesses the system illegally.

Therefore, it is desirable to store a password number corresponding to the caller number in the balance database 18 in advance and to operate so as to confirm the person by inputting the password number in executing the payment of the charge of mail-order sales.

A list of handled merchandises is stored per each mail-order company 86 in the charge database 20. They are updated as necessary and the latest catalog is distributed to the callers 12 each time by FAX or the like.

When the caller terminal is a personal computer 89, it is possible to transmit the latest-merchandise data through on-line so that the caller can select a desirable merchandise among them at the point of time when the caller makes an access to the system 84 through a telephone line.

This system 84 may be applied not only to the payment of charge of merchandises but also to the payment of charge in transaction of information.

For instance, information database 90 storing various data having a transactional value such as electronized texts, sounds, images and computer software is prepared (FIG. 10).

Code numbers specifying each data, charge information and others are stored in the charge database 20.

A person who wants to buy the information by utilizing this system 84 makes a connection to the system 84 from a terminal such as the portable telephone 13 and a fixed telephone set 91 and inputs a code number specifying the necessary data in the same manner with the case of purchasing a merchandise.

When the balance of the caller 12 is sufficient for purchasing the data, the data is transmitted to the terminal of the caller 12 as a speech signal and is then line is disconnected.

That is, instead of the "process for shipping the merchandise" (S96) in FIG. 11, the "process for transmitting information" is carried out via the telephone line and a process for disconnecting the line is executed at the point of time when the transmitting process is completed.

Or, when the charge system of the data is a meter-rate system, it is operable to calculate a transmission permissible time from the balance and the hourly unit cost and to disconnect the line forcibly when the time comes.

When the caller 12 makes a connection by dialing up by a computer such as a personal computer 89, it is operable to distribute computer software and data for a personal computer stored in the information database 90 by on-line and to subtracts the charge from the balance database 18.

Although there has been a service which provides fee-charging information via a telephone line, there has been a risk that an unexpectedly expensive bill is charged later because it has been a system which requires to pay the information fee and the telephone charge later.

However, because this system 84 allows the caller 12 to purchase the information only within the range of the prepaid balance, it is possible to eliminate such a risk as described above.

The information within the information database 90 is updated periodically by the system operator himself or by the outside information provider.

Because the system 84 is provided with the both telephone-charge payment function and mail-order sales charge payment function, it is convenient for the caller because he can pay the telephone charge or the mail-order sales charge as necessary.

It is also possible to construct a system having only the mail-order payment function as a matter of course. In such a case, the call permission determining part 28, the optimum communication company specifying part 29 and others may be omitted.

Figure 12:
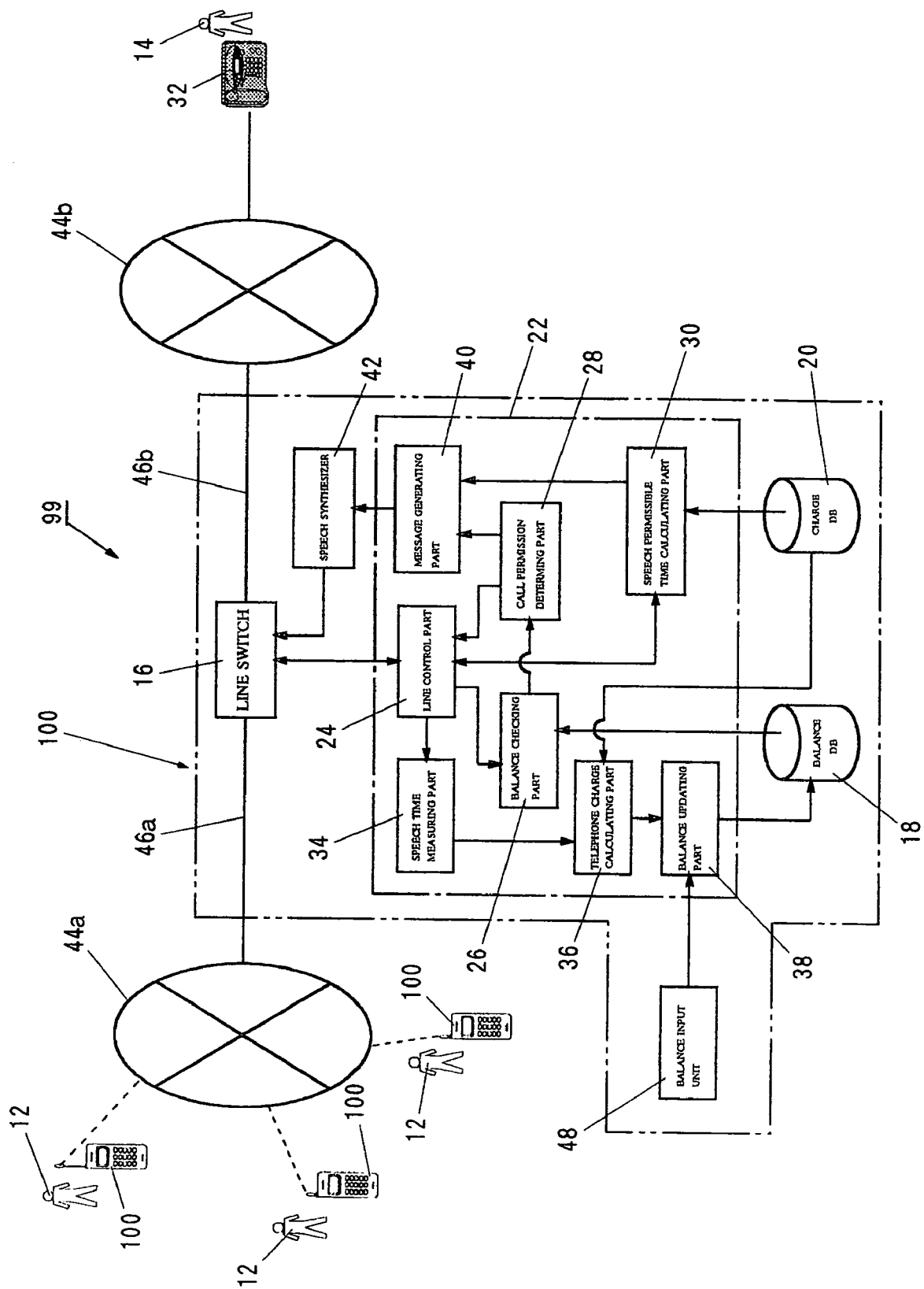
FIG. 12 is a block diagram showing a fourth communication control system according to the present invention.

FIG. 12 shows a fourth communication control system 99. It allows the portable telephone to be used more simply by implementing a call restriction which allows the portable telephone 100, i.e., a caller terminal, to call only the line number of the communication control system 99.

The communication control system 99 is equal with the communication control system 10 except of that there is no "communication company specifying part 29", so that its detailed explanation will be omitted here.

Figure 13:
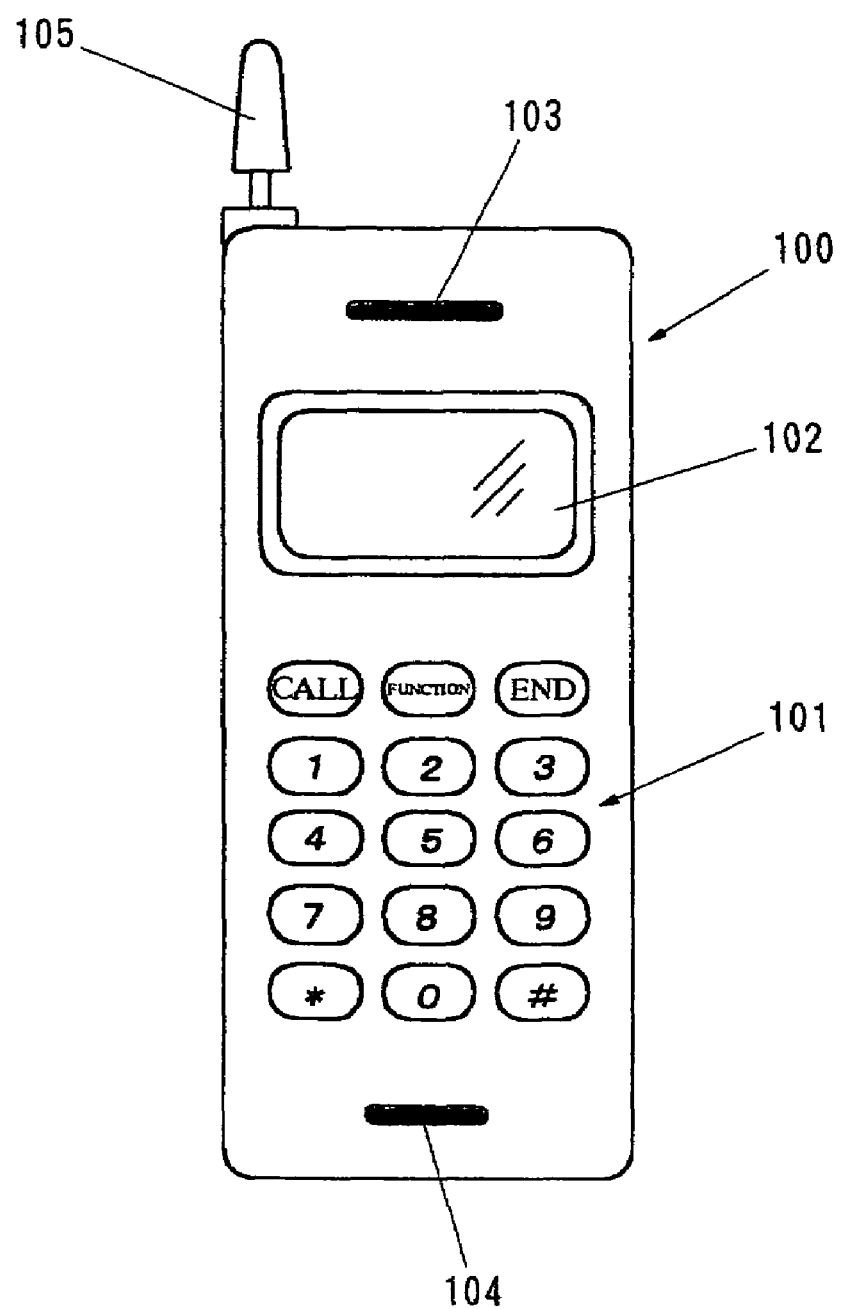
FIG. 13 is a front view showing one exemplary portable telephone used in the above-mentioned systems.

The portable telephone 100 used in the communication control system 99 comprises, as shown in FIG. 13, a plurality of push buttons 101 for inputting telephone numbers and others, a liquid crystal display 102, a sound outputting speaker 103, a sound inputting microphone 104 and a radio transmitting/receiving antenna 105.

Figure 14:
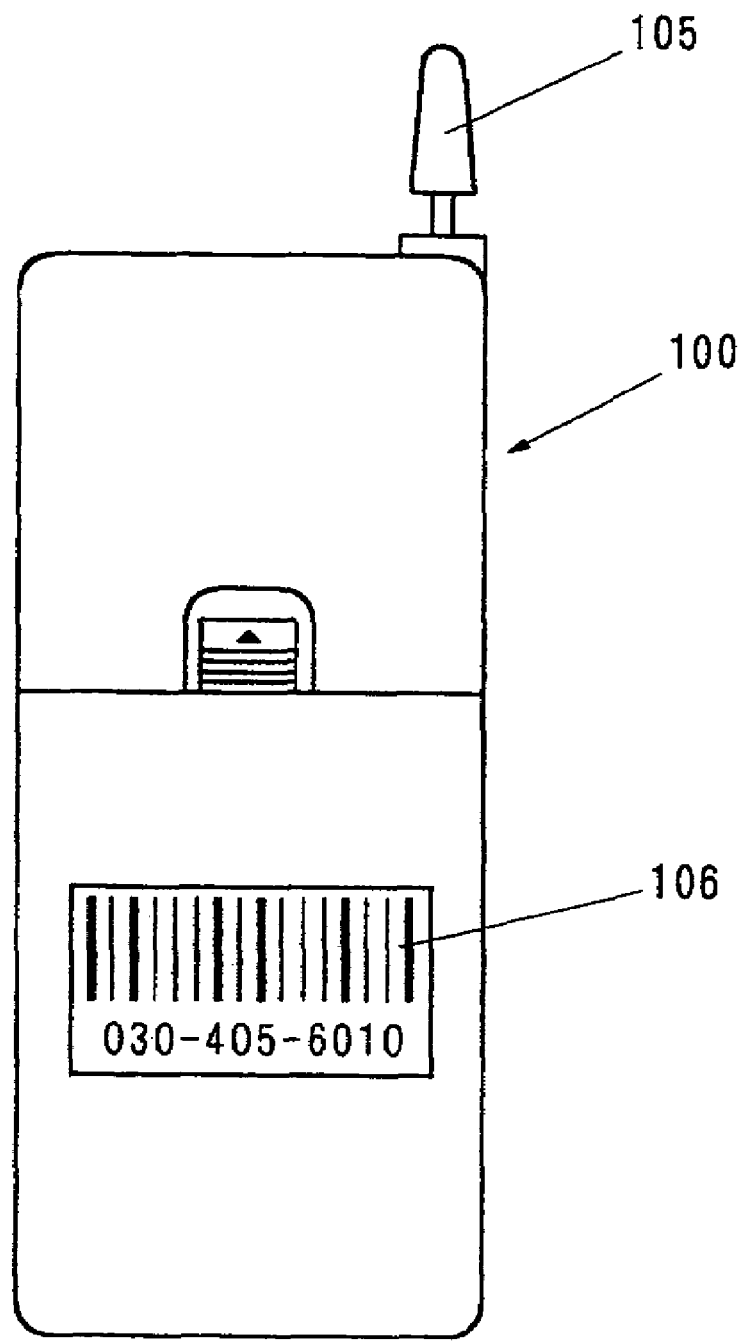
FIG. 14 is a back view of the portable telephone.

Further, as shown in FIG. 14, a bar-code 106 showing a telephone number (caller number) assigned to the portable telephone 100 is indicated on the back of the portable telephone 100.

Figure 15:
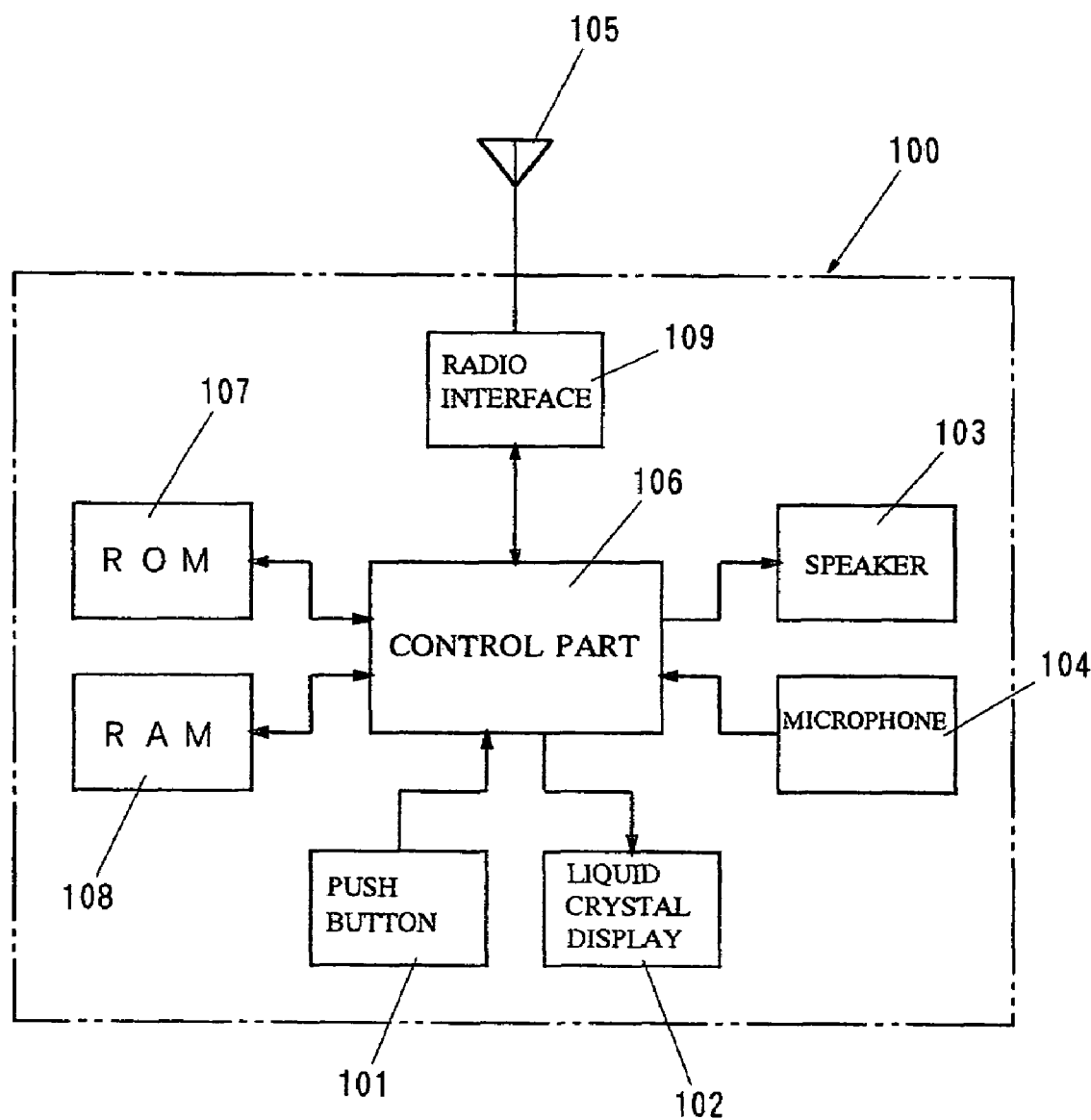
FIG. 15 is a block diagram showing a part of the internal structure of the portable telephone.

FIG. 15 is a block diagram showing a part of the internal mechanism of the portable telephone 100. The portable telephone 100 comprises a control section 106 composed of a CPU which controls the whole system. The control section 106 is connected with a radio interface 109 which controls the radio communications, beside a ROM 107 and a RAM 108 as storage means. The push buttons 101, the liquid crystal display 102, the speaker 103, the microphone 104 and others are connected thereto via an I/O interface not shown.

Beside a program for controlling the operation of the portable telephone 100, the ROM 107 stores, telephone number data out of the subject of the restriction of transmission set in advance. In concrete, the telephone number for connecting with the communication control system 99 is stored.

When the caller inputs a series of numbers by the push buttons 101, the control section 106 stores them temporarily in a predetermined area within the RAM 108 and reads the telephone number set within the ROM 107. Next, it compares the inputted number with the preset number and when they coincide, outputs that number to the radio interface 109 to transmit to the outside from the antenna 105 on carrier wave.

The nearby base station receives the telephone number transmitted from the antenna 105 and connects it to the communication control system 99 via the public line network 44a.

When the input number does not coincide with the preset number, the system indicates a message such as "Transmission impermissible" and rejects the transmission of the input number.

That is, the so-called call restriction is implemented to the portable telephone 100 so that the directly transmissible telephone number is limited to the line number of this communication control system 99.

Because the telephone number for connecting to the system 99 is abbreviated and registered in a "Transmission" button within the push buttons 101 in advance, the connection to the system 99 can be made just by pushing this "Transmission" button. It is also possible to connect to the system 99 by individual push buttons 101.

It is also possible to arrange so as to set emergency telephone numbers such as "110" and "119" beside the line number of the system 99 and to put them, which are free of charge, out of the subject of the restricted transmission.

Next, the operating method in using the portable telephone 100 to which such call restriction is implemented will be explained. At first, a person who wants to use the portable telephone 100 acquires the portable telephone set including the portable telephone 100, a battery, a manual and others from the system operator. It is possible to acquire it from an automatic vending machine and a mail-order sales system as detailed later, beside acquiring at a service counter of an agent tied with the system operator.

This portable telephone 100 is what the system operator has bought by the gross from each mobile communication company in advance and what a tentative (with a starting condition) subscriber contract has been made with the mobile communication company and the user rents the portable telephone 100 from the system operator onerously (acquisition fee of 5,000 yen for example).

Because the portable telephone 100 is not operative yet at this point of time, no basic fee involving in the subscription of the service of the portable telephone will be charged. Further, there is no risk of being charged with an unknown telephone charge even if it stolen by chance.

In order to start to call by using the portable telephone 100, the user makes a contact with the system operator by using a public telephone or a home telephone to tell the caller number indicated on the own portable telephone 100 and to ask to make it operative.

The acquisition fee described above includes the telephone charge of the portable telephone 100 by a certain rate. That is, when mobile communication company supplying the portable telephone 100 adopts a charge system of "basic fee+ telephone charge", the acquisition fee includes the basic fee of one month and a certain amount of telephone charge.

Receiving the contact, the system operator registers amount information corresponding to the basic fee and the telephone charge in the balance database 18 in correspondence to the caller number by using the balance input unit 48 (keyboard and the like).

A table having items such as the current balance and update date by keying the caller number is prepared in the balance database 18 in the same manner with what shown in FIG. 2.

The system operator makes a contact with the mobile communication company to ask to make the caller number operable.

By receiving the contact, the mobile communication company makes the caller number operative so that the portable telephone 100 can be used thereafter. The time required to make it operable is as short as five minutes or less.

In the same time, the subscriber contract of the portable telephone 100 is effected and the basic fee is started to be charged.

The user can acquire the portable telephone 100 by simply paying the charge and can use the portable telephone 100 by the very simple procedure of making a call to the system operator without being required to press a seal, to show an identification or without waiting the result of preliminary examination.

Because the telephone charge included in the acquisition fee is relatively low (the degree by which a local call can be made by 10 minutes for example), it is necessary to pay the prepaid money anew and to replenish the balance information in own account in the balance database 18 in order to assure enough speech time and distance.

That is, the user writes an amount to be paid (10,000 yen for example) on a certain number of transfer sheets not shown and appended within the portable telephone set and then brings it to a banking organ or a convenience store to submit together with cash.

Then, after getting a receipt stamp of the banking organ or the convenience store on a copy of the transfer sheet, the user transmits it to the operator of the communication control system 99 by FAX.

The caller number of the portable telephone 100 is written to the copy by bar-code or characters in advance and the system operator inputs the prepaid amount by using the balance input unit 48 (bar-code reader, a keyboard and the like) in correspondence to the caller number. The input data is stored in the balance database 18 via the balance updating part 38.

The user who wants to register own name, address, where to make contact and others describes those items in that copy. The system operator can refer to them in providing various services later by registering such information described in the copy sent by FAX in the balance database and others.

It is needless to say that when the user wants to cancel the contract, the prepaid money is cleared and the balance is returned.

The above-mentioned process may be simplified further by connecting the computer composing an information management system of the banking organ or the convenience store in on-line with the computer composing the communication control system 99.

That is, at the moment when the data of the caller number and the amount of prepaid money is inputted from the terminal of the banking organ or the convenience store, they are automatically registered within the balance database 18 via the balance updating part 38 of the communication control system 99. Accordingly, it is possible to save the works of the applicant who transmits the copy to the system operator by FAX and of the system operator who input the data.

In this case, the terminal of the banking organ or the convenience store functions as a balance input unit 48.

Or it is also possible to arrange so as to indicate a bar-code 106 corresponding to the caller number on the back of the portable telephone 100 and so as to read it by a bar-code reader connected to the terminal of the banking organ or the convenience store, as shown in FIG. 14.

After registering the enough prepaid balance information in the balance database 18 and completing the works for making the portable telephone 100 operative by the mobile communication company, the user presses the "Transmission" button of the portable telephone 100. As a result, the portable telephone 100 is immediately connected with the communication control system 99, thus establishing the speech channel.

Figure 16:
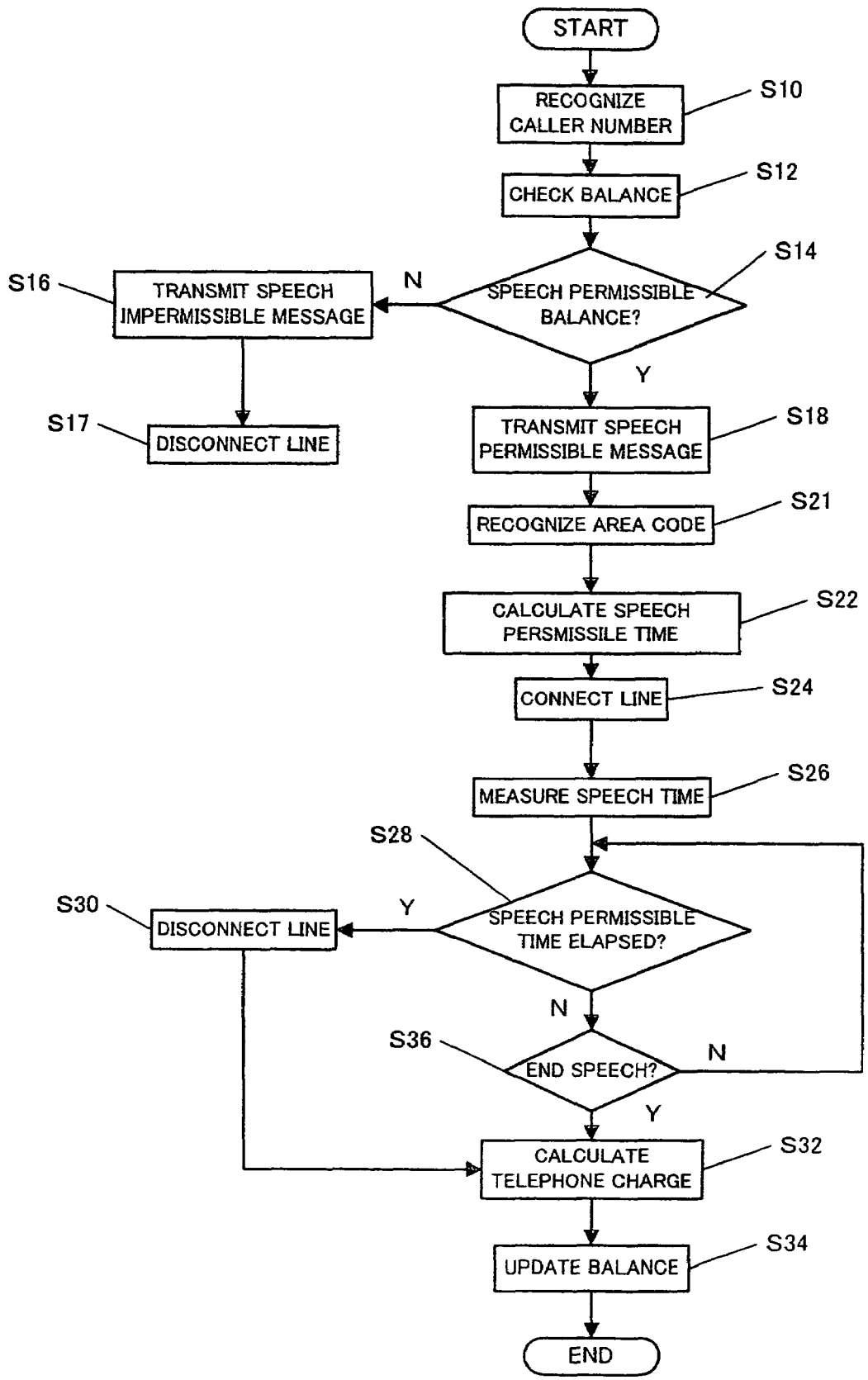
FIG. 16 is a flowchart showing the operating method of the fourth communication control system.

As shown in a flowchart in FIG. 16, the line control part 24 recognizes the caller number of the portable telephone 100 (S10) and sends it to the balance checking part 26.

With the keyword of the caller number, the balance checking part 26 searches the balance database 18 to check the current balance of prepaid money of the caller (S12).

The balance data checked here is sent to the call permission determining part 28. The call permission determining part 28 determines whether or not the balance is an amount which permits the call (S14). That is, when the balance is below an amount (100 yen for example) which has been set beforehand, the call permission determining part 28 determines as "speech is not permitted" and sends the result of determination to the line control part 24 and the message generating part 40.

The message generating part 40 generates a message signal of contents of "Unable to connect because short of balance" for example and outputs it to the speech synthesizer 42. Receiving the signal, the speech synthesizer 42 synthesizes a speech corresponding to the message signal and transmits it to the portable telephone 13 via the line switch 16 (S16).

At the point of time when the transmission of the speech message is completed, the line control part 24 disconnects the line with the portable telephone 100 (S17).

When the balance of prepaid money exceeds a predetermined amount in contrary, the call permission determining part 28 determines as "speech permissible" and sends the result of determination to the line control part 24 and the message generating part 40.

The message generating part 40 generates a message signal of contents of "Speech is permissible by an amount of 100 yen. Input a telephone number of the called side" and outputs it to the speech synthesizer 42. The message which has been transformed into the speech is transmitted to the portable telephone 100 via the line switch 16 (S18).

When the caller 12 inputs the called side telephone number by using the push buttons 101, the speech permissible time calculating section 30 recognizes the area code (S21), searches the charge database 20 with the keyword thereof and applies the balance to the charge system of the portable telephone 100 to calculate a speech permissible time (S22).

That is, the charge system of the telephone charge (unit cost information) divided per area code and time zone is stored within the charge database 20 per each mobile communication company. The unit cost of the telephone charge is determined by applying the area code and the current time and date information to the charge system of one mobile communication company specified based on the caller number and the concrete speech permissible time may be calculated by dividing the balance by this unit cost.

When the speech permissible time is calculated as described above, this result is sent to the line control part 24 and the message generating part 40.

The message generating part 40 generates a message signal of contents of "Speech is permissible for 10 minutes. Connection will be made soon" and outputs it to the speech synthesizer 42. The speech synthesizer 42 synthesizes a speech corresponding to that and transmits it to the portable telephone 100 via the line switch 16.

After that, the line control part 24 generates a dialing signal corresponding to the inputted called side telephone number and sends it to the public line network 44b via the line switch 16. Then, at the point of time when the speech channel is established with the called terminal 32 via the exchange of the mobile communication company, the line switch 16 connects the line between the portable telephone 100 and the called terminal 32 (S24).

In the same time, the speech time measuring part 34 starts to measure the speech time (S26).

The line control part 24 always monitors the measured result of the speech time measuring part 34 and determines whether or not the speech permissible time has elapsed (S28).

When the speech permissible time has elapsed, the line control part 24 outputs a control signal immediately to the line switch 16 to forcibly disconnect the line between the portable telephone 100 and the called terminal 32 (S30).

The measured result of the speech time measuring part 34, i.e., the speech time, is outputted from the speech time measuring part 34 to the telephone charge calculating part 36. The telephone charge calculating part 36 calculates the actual telephone charge based on this speech time and the charge system stored in the charge database 20 (S32) and outputs it to the balance updating part 38.

The balance updating part 38 updates and registers an amount obtained by subtracting the above-mentioned telephone charge from the balance in the balance database 18, i.e., 0 yen, as new balance information (S34).

When the speech ends within the speech permissible time, i.e., when a spontaneous line disconnecting action is carried out between the portable telephone 100 and the called terminal 32, the line control part 24 detects a disconnect signal (on-hook signal) (S36) and the speech time measuring part 34 stops to measure the speech time.

The speech time measured by the speech time measuring part 34 is outputted from the speech time measuring part 34 to the telephone charge calculating part 36. The telephone charge calculating part 36 calculates the actual telephone charge based on this speech time and the charge system stored in the charge database 20 (S32) and outputs it to the balance updating part 38.

The balance updating part 38 updates and registers an amount obtained by subtracting the above-mentioned telephone charge from the balance in the balance database 18 as new balance information (S34).

The telephone charge (including the basic fee) caused by the use of the fourth communication control system 99 is billed later from each one of the mobile communication companies to the system operator.

The system operator appropriates the prepaid money of the caller 12 which has been transferred to own bank account through the banking organ or the convenience store to this payment.

It is also possible to operate so as to collect a rental (lease) fee from the balance at a certain rate every time when the caller 12 uses this communication control system 99. For instance, it is possible to assure a difference between the reduction of the balance and the payment to the mobile communication company as the rental fee by putting a certain amount of rental fee on the charge system in the charge database 20 from the beginning and by calculating the speech permissible time and the telephone charge based on the put-on fee.

It is also possible to operate so as to subtract a predetermined amount of rental fee from the balance in unit of one month.

The caller 12 can get the following merits by using the fourth communication control system 99 using the portable telephone 100 to which the call restriction is implemented.
(1) The portable telephone may be used with the very simple procedure.

That is, because it is arranged so that the portable telephone 100 which the system operator has purchased from each mobile communication company is rented, the subscriber contract which requires a seal to be stamped and an identification to be shown is made between the system operator and the mobile communication company to the end and the end user is free of such procedure.

The end user only needs to pay an amount of money to be used and the basic fee in advance.
(2) It is possible to prevent such a situation from occurring that expenses increases unexpectedly by excessively using the portable telephone 100 because the calls are permitted within the range of the amount set by himself in advance.

Accordingly, the parent can control the telephone charge when the parent gives the portable telephone 100 to own child for example.

It is noted that the portable telephone 100 can receive all calls made thereto from a third person because no incoming-call restriction is implemented to the portable telephone 100.

The mobile communication company can also get the following merits from the communication control system 10.
(1) The mobile communication company only needs to make a contract with the operator of the communication control system 99 and needs not to make a utility contract with the user of the portable telephone 10 individually. Therefore, it is possible to remarkably reduce the cost for managing a large number of end users.
(2) Because the operator of the system 99 collects the telephone charge, no bad debt of the telephone charge occurs and the communication company can devote to the provision of the services without anxiety.

This communication control system 99 can also suppress the risk of the system operator to the minimum.

That is, because the number to which the caller 12 can make a call directly from the portable telephone 100 is limited to the line number of this communication control system 99 except of the free emergency calls such as 110 and 119, the caller 12 cannot make a long-distance call or an international call freely without going through this system 99.

Accordingly, there is no risk of receiving a bill exceeding the balance of the prepaid money from the mobile communication company later.

It is noted that it is possible to avoid the risk of being unable to collect the basic fee of the next month by operating such that the call permission determining part 28 determines the permission of the speech after subtracting the basic fee of the next month from the current balance.

The use of the portable telephone 100 to which such call restriction is implemented allows the following usage modes to be realized.

At first, because no cumbersome procedure in starting to use the portable telephone 100 is required, the portable telephone 100 may be supplied by vending machines.

This vending machine may be set around arrival gates of an airport. Then, foreigners who come to Japan temporarily for tourism or business can acquire the set of the portable telephone 100, a battery and others by the vending machine by putting in 5,000 yen for example.

In this case, the battery of the portable telephone 100 is charged in advance so that calls can be made for a certain period of time.

A manual in the main foreign languages such as English, Germany, French, Chinese, Korean, Spanish and others is enclosed in the set.

The foreigner who has acquired the portable telephone 100 makes a call to the system operator from a public telephone within the airport in accordance to the manual to tell the caller number and to ask to make the telephone operative. Further, the foreigner pays the prepaid money in a shop or a bank within the airport and transmits a copy on which a receipt stamp is stamped to the system operator by FAX.

As a result, even the foreigners who have no address in Japan can use the portable telephone 100 while staying in the country.

In returning to home, the foreigner returns the portable telephone 100 in exchange for a certain amount of cash (refund of 2,000 yen for example) and settles the balance at a service counter of the agent who cooperates with the system operator.

It is noted that it is also possible to arrange the charge database 20 so as to manage by a computer system of the mobile communication company who provides the portable telephone 100. It is better when the communication control system 99 is constructed in the manner in which portable telephones 100 provided by a plurality of mobile communication companies are mixed because the charge system is different per each mobile communication company and the charge may be revised often.

INDUSTRIAL APPLICABILITY

The caller can make calls only within the range of balance of prepaid money and the communication company takes no risk of causing a bad debt of telephone charge by using the inventive communication control system. Therefore, the caller is only required to tell the caller number of own mobile communication terminal and to pay the prepaid money of certain amount or more in making an international call from the mobile communication terminal such as a portable telephone and is not required to be examined rigidly by the international communication company like the past. Further, a plurality of international communication companies may participate so that the caller can freely select an international communication company whose charge is most advantageous.

It is possible to eliminate the risk of causing an unexpected telephone charge and many people can use the mobile communication terminals by implementing the call restriction to the caller terminal so that it cannot be connected to places other than the system.

The mail-order sales may be implemented within the range of the prepaid money paid by the caller, the merchandise provider can recover the charge reliably without taking the risk of causing a bad debt by applying this system to the payment of charge of mail-order sales via telephone lines. The caller can also save time for transferring the charge and can save the transmittance fee or the substitutional payment fee. As a result, the mail-order business may be activated.

The invention claimed is:

1. A Communication control system interposed between a mobile communication terminal as a caller terminal and exchanges of a plurality of international communication companies, comprising:

balance storage means for storing an amount of prepaid money of the caller together with the caller number of said mobile communication terminal;

charge storage means for storing the charge system of each said international communication company;

balance checking means for checking the balance of the prepaid money of said caller by searching said balance storage means with the caller number automatically sent from the exchange belonging to a public line network as a key when a connection is made from said caller terminal to the telephone line of the communication control system;

call permission determining means for determining the permission of a call of said caller based on the balance;

communication company specifying means for recording the charge systems of the plurality of international communication companies and for specifying one international communication company among the plurality of international communication companies;

speech permissible time calculating means for calculating a speech permissible time by applying the number of the called terminal inputted from the caller terminal and the balance of the prepaid money to the charge system of said international communication company;

line connecting means for connecting the caller terminal with the called terminal via an exchange of said international communication company;

speech time measuring means for measuring the speech time between said caller terminal and said called terminal;

line disconnecting means for disconnecting the speech channel between the caller terminal and the called terminal at the moment of time when the speech permissible time passes;

telephone charge calculating means for calculating the telephone charge by applying said speech time to the charge system of said international communication company; and balance updating means for subtracting said telephone charge from the balance of the prepaid money of said caller within said balance storage means;

said communication control system being characterized in that different telephone lines are allocated to each of said plurality of international communication companies in advance of said communication company specifying means specifies one international communication company by the telephone line to which a connection is made from said mobile communication terminal to this communication control system.

2. The communication control system as described in claim 1, comprising:

credit card storage means for storing information regarding a credit card of a caller who selects to pay by the credit card together with the caller number of said mobile communication terminal;

payment type discriminating means for judging whether the caller is the person who selects to pay by prepaid money or the person who selects to pay by the credit card based on the caller number automatically sent from an exchange belonging to a public line network when a connection is made from said mobile communication terminal to the line of the communication control system;

credit inquiring means for inquiring the credit of the caller by transmitting the credit card information of the caller to a computer system managed by the outside credit card company when it is determined that said caller is the person who selects to pay by the credit card;

call permission determining means for determining the permission of a call of said caller based on the result of inquiry of the credit;

line connecting means for connecting the mobile communication terminal with the called terminal via an exchange of the international communication company specified by said communication company specifying means when said call permission determining means has determined that the call is permissible;

speech time measuring means for measuring the speech time between said mobile communication terminal and said called terminal;

telephone charge calculating means for calculating the telephone charge by applying said speech time to the charge system of said international communication company; and telephone charge billing means for transmitting said telephone charge to the computer system managed by the credit card company.

3. A communication control method of a communication control system interposed between a mobile communication terminal as a caller terminal and exchanges of a plurality of international communication companies, comprising:

a step of storing an amount of prepaid money of said caller together with the caller number of said mobile communication terminal in balance storage means;

a step of storing the charge system of each international communication company in charge storage means;

a step of checking the balance of the prepaid money of said caller by searching said balance storage means with the caller number which is automatically sent from the exchange belonging to a public line network as a key when a connection is made from said mobile communication terminal to the telephone line of the communication control system;

a step of determining the permission of a call of said caller based on the balance of the prepaid money;

a step of specifying one international communication company among said plurality of international communication companies;

a step of calculating a speech permissible time by applying the number of the called terminal inputted from the mobile communication terminal and the balance of the prepaid money to the charge system of said international communication company;

a step of connecting the mobile communication terminal with the called terminal via an exchange of said international communication company;

a step of measuring the speech time between said mobile communication terminal and said called terminal;

a step of disconnecting the speech channel between the mobile communication terminal and the called terminal at the moment of time when the speech permissible time passes;

a step of calculating the telephone charge by applying said speech time to the charge system of said international communication company; and a step of subtracting said telephone charge from the balance of the prepaid money of said caller within said balance storage means;

said communication control method being characterized in that different telephone lines are allocated to each of said plurality of international communication companies in advance and the international communication company is specified by the telephone line to which a connection is made from said mobile communication terminal to this communication control system in the step of specifying one international communication company among the plurality of international communication companies.

4. The communication control method as described in claim 3, comprising:

a step of storing information regarding a credit card of a caller who selects to pay by the credit card together with the caller number of said mobile communication terminal in credit card storage means;

a step of judging whether the caller is the person who selects to pay by prepaid money or the person who selects to pay by the credit card based on the caller number sent automatically from an exchange belonging to a public line network when a connection is made from said mobile communication terminal to the telephone line of the communication control system;

a step of inquiring the credit of the caller by transmitting the credit card information of the caller to a computer system managed by the outside credit card company when it is determined that said caller is the person who selects to pay by the credit card;

a step of determining the permission of a call of said caller based on the result of inquiry of the credit;

a step of connecting the mobile communication terminal with the called terminal via an exchange of one international communication company specified among said plurality of international communication companies when it is determined that the call is permissible in the above-mentioned step;

a step of measuring the speech time between said mobile communication terminal and said called terminal;

a step of calculating the telephone charge by applying said speech time to the charge system of said international communication company; and a step of transmitting said telephone charge to the computer system to charge the telephone charge.

* * * * *